United States Patent
Wirola et al.

(10) Patent No.: US 9,220,016 B2
(45) Date of Patent: Dec. 22, 2015

(54) POSITION MONITORING FOR A COVERAGE AREA

(75) Inventors: Lauri Aarne Johannes Wirola, Tampere (FI); Tommi Antero Laine, Tampere (FI)

(73) Assignee: Nokia Technologies Oy, Espoo (FI)

(*) Notice: Subject to any disclaimer, the term of this patent is extended or adjusted under 35 U.S.C. 154(b) by 486 days.

(21) Appl. No.: 13/254,271

(22) PCT Filed: Mar. 4, 2009

(86) PCT No.: PCT/US2009/001431
§ 371 (c)(1),
(2), (4) Date: Sep. 1, 2011

(87) PCT Pub. No.: WO2010/101551
PCT Pub. Date: Sep. 10, 2010

(65) Prior Publication Data
US 2011/0319097 A1    Dec. 29, 2011

(51) Int. Cl.
H04W 24/00 (2009.01)
H04W 16/18 (2009.01)
H04W 76/00 (2009.01)
H04W 64/00 (2009.01)
H04W 4/02 (2009.01)
H04W 24/08 (2009.01)

(52) U.S. Cl.
CPC ............ *H04W 16/18* (2013.01); *H04W 76/007* (2013.01); *H04W 4/02* (2013.01); *H04W 24/08* (2013.01); *H04W 64/003* (2013.01)

(58) Field of Classification Search
CPC ..... H04W 64/00; H04W 64/003; H04W 4/02; H04W 4/028; H04W 88/02
USPC .......................................... 455/456.1–456.6
See application file for complete search history.

(56) References Cited

U.S. PATENT DOCUMENTS

| | | | |
|---|---|---|---|
| 7,330,112 B1* | 2/2008 | Emigh et al. | 340/539.13 |
| 2002/0101375 A1 | 8/2002 | Stilp et al. | |
| 2003/0017832 A1 | 1/2003 | Anderson et al. | |
| 2003/0054835 A1* | 3/2003 | Gutowski et al. | 455/456 |
| 2005/0003831 A1 | 1/2005 | Anderson | |
| 2006/0094438 A1* | 5/2006 | Hamilton et al. | 455/452.2 |
| 2006/0141932 A1 | 6/2006 | Lawrence et al. | |
| 2006/0183487 A1* | 8/2006 | Allen et al. | 455/456.5 |
| 2007/0129082 A1* | 6/2007 | Thacher | 455/456.1 |
| 2008/0085692 A1 | 4/2008 | Hart et al. | |

OTHER PUBLICATIONS

U.S. Appl. No. 13/202,603, filed Aug. 22, 2011, Lauri Wirola.
U.S. Appl. No. 13/202,591, filed Aug. 22, 2011, Lauri Wirola.
U.S. Appl. No. 13/202,609, filed Aug. 22, 2011, Lauri Wirola.
U.S. Appl. No. 13/202,595, filed Aug. 22, 2011, Lauri Wirola.

* cited by examiner

*Primary Examiner* — Charles Appiah
*Assistant Examiner* — Jaime Holliday
(74) *Attorney, Agent, or Firm* — Locke Lord LLP

(57) ABSTRACT

It is disclosed a method, an apparatus and a computer program for monitoring, for a position of a set of one or more positions that are associated with a coverage area of a communication node, if a report comprising a position associated with said coverage area of said communication node and lying in a defined environment of said position for which said monitoring is performed is received as a validation of said position for which said monitoring is performed.

22 Claims, 12 Drawing Sheets

POSITION MONITORING FOR A COVERAGE AREA

FIELD

This invention relates to monitoring a position that is associated with a coverage area.

BACKGROUND

As an alternative or add-on to satellite-based positioning systems, positioning systems in which a present position of a terminal is estimated based on a list of communication nodes (such as for instance cellular base station, access points or beacons) that can presently be heard by the terminal and a database that contains identifiers and positions of the communication nodes and/or models for the coverage areas for a number of communication nodes have gained recent interest.

Given that the communication node positions are known and distances from the terminal to the communication nodes can be estimated, the terminal's position can be estimated through triangulation. Distance between a terminal and the heard communication nodes can be estimated for instance based on either the path loss using a channel model (i.e. how much the signal attenuates between the terminal and the communication node) or based on timing (or round-trip timing) measurements (i.e. information expressing how long signals propagate between terminal and communication node).

Alternatively, if models for the communication node coverage areas are known, then a terminal may pick the coverage areas for the heard communication nodes and find the intersection of these coverage areas. The terminal can then be assigned a position that is, for instance, the center-of-mass of the intersection area. Similarly an error estimate for the position estimate can be given, for example, based on the size of the intersection.

A model for the coverage area of a communication node can for instance be determined by having one or more terminals that are capable of determining their position send reports with their present position and a list of communication nodes that can presently be heard, gathering, for each communication node, the terminal positions reported into a set of terminal positions and deriving, from this set of terminal positions, a model for the coverage area of the communication node.

SUMMARY OF SOME EXEMPLARY EMBODIMENTS OF THE INVENTION

While generation and/or updating of models for static or growing coverage areas may be accomplished by finding a suited representation for the base-station specific terminal positions gathered so far, generation and/or updating of models for moving, shrinking or disappearing coverage areas may require additional measures to be taken. The same holds for handling potential outliers with respect to the coverage area.

According to a first aspect of the present invention, a method is disclosed, comprising monitoring, for a position of a set of one or more positions that are associated with a coverage area of a communication node, if a report comprising a position associated with the coverage area of the communication node and lying in a defined environment of the position for which the monitoring is performed is received as a validation of the position for which the monitoring is performed.

According to a second aspect of the present invention, further an apparatus is disclosed, comprising a processor configured to monitor, for a position of a set of one or more positions that are associated with a coverage area of a communication node, if a report comprising a position associated with the coverage area of the communication node and lying in a defined environment of the position for which the monitoring is performed is received as a validation of the position for which the monitoring is performed.

The processor may for instance be implemented in hardware alone, may have certain aspects in software alone, or may be a combination of hardware and software. An exemplary embodiment of the processor may comprise a memory, wherein instructions executed by the processor may be transferable to the memory and/or contained in the memory. The memory may for instance store a program according to the fourth aspect of the present invention described below, or at least parts thereof.

According to a third aspect of the present invention, furthermore an apparatus is disclosed, comprising means for monitoring, for a position of a set of one or more positions that are associated with a coverage area of a communication node, if a report comprising a position associated with the coverage area of the communication node and lying in a defined environment of the position for which the monitoring is performed is received as a validation of the position for which the monitoring is performed. Examples of such a means a processor, but the means is not limited thereto.

According to a fourth aspect of the present invention, further a program is disclosed, comprising program code for performing the method according to the first aspect of the present invention and all exemplary embodiments thereof as described below, when the program is executed on a processor.

The program may for instance be distributed via a network, such as for instance the Internet. The program may for instance be stored or encoded on a readable-medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device. The readable medium may for instance be a tangible medium, for instance a tangible storage medium.

According to the present invention, the communication node may for instance be a communication node of a communication system. It may then for instance provide coverage for one or more terminals. The communication system may be a wireless or a wire-bound communication system, and may be of cellular or non-cellular type. The communication node may for instance be a one-directional or bi-directional communication node. Non-limiting examples of the communication node as understood in this specification are thus a cellular base station, a Wireless Local Area Network (WLAN) access point, a Bluetooth station, an FM radio station, and a TV station. The communication node may be fixed or mobile, for instance with low mobility and/or velocity. In case of sectorization of cells, each sector may also be understood as a communication node, even if all sectors are controlled by the same (cellular) base station.

The communication node has a coverage area, which may be understood as an area within which (fixed or mobile) terminals are able to receive signals sent from the communication node at least with a pre-determined minimum quality, wherein the quality may for instance be expressed in terms of signal strength or signal-to-noise-ratio, to name but a few examples. In case of a wireless communication node, the coverage area may for instance depend on the transmission frequency and the propagation environment, which may for instance cause shadowing. The coverage area does not necessarily have to be continuous, it may equally well have recesses and may equally well consist of several sub-areas.

For the coverage area of the communication node, there exists a set of one or more positions that are associated with the coverage area. The positions may for instance be associated with the coverage area since they are considered to be positioned within the coverage area and/or have been reported to be within the coverage area. The set of one or more positions may for instance be considered to be representative of the coverage area and/or may serve as a basis for generating and/or updating one or more models for the coverage area of the communication node. The set of positions may for instance be considered to represent a boundary for the coverage area.

The positions may for instance be derived from reports (also called fingerprints) sent by one or more terminals, wherein the reports may for instance comprise a position of the one or more respective terminals and a list of the communication node(s) a respective terminal is currently able to hear. The positions contained in the report may also have been collected by the terminal over an extended period of time. The report may for instance comprise several positions, each associated with a list of communication nodes that the terminal was able to hear when the respective position was determined. Therein, a terminal may for instance be considered to "hear" a communication node if it is able to receive one or more signals, which are sent by the communication node, with a pre-defined minimum quality, wherein the quality may for instance be defined in terms of a signal-to-noise ratio or a signal-to-noise and interference ratio. An example of such a signal sent by a communication node may for instance be a broadcast channel. As an alternative, the terminal may for instance be considered to "hear" a communication node if the terminal is capable of at least partially receiving and correctly decoding one or more signals sent by the communication node, such as a broadcast channel. For instance, the terminal may considered to "hear" the communication node if it is at least able to decode an identification of the communication node (e.g. a MAC address or any other type of communication node identification). The information which communication nodes a terminal can hear may for instance result from a scanning/sniffing operation performed by the terminal.

For a position of the set of one or more positions, it is determined if a report comprising a position associated with the coverage area of the communication node and lying in a defined environment of the position for which monitoring is performed is received. Therein, the position comprised in the report may for instance be associated with the coverage area of the communication node since it is considered to be positioned within the coverage area and/or has been reported to be within the coverage area. The report (e.g. a fingerprint) contains at least one position and optionally further parameters, such as for instance a timestamp, which may for instance be generated by a terminal that generates the report or by a unit that receives the report, to name but a few examples.

The defined environment may for instance be defined before or when monitoring of the position is started or triggered. It may for instance be a pre-defined environment. It may be defined independent or dependent of (e.g. relative to) the position for which the monitoring is performed. The environment may be fixed or variable, it may for instance be adjustable to control the accuracy of the monitoring. The environment may for instance be the same for all positions in the set of one or more positions, or may be different for at least two (or even all) positions in the set. The defined environment may for instance be specific for the position for which the monitoring is performed. For the same position, the environment used in a first monitoring may be different from the environment in a second monitoring, for instance the environment may be smaller in the second monitoring as compared to the first monitoring to increase the accuracy of monitoring. The defined environment may be associated with the position for which the monitoring is performed. A size of the defined environment may for instance be controlled depending on an amount and/or a frequency of reports received in a coverage area. This control may be time-dependent, for instance dependent on a calendar.

The environment may for instance be centered around the position for which the monitoring is performed. Equally well, the position for which the monitoring is performed may be eccentric with respect to the environment, it may for instance be on a border of the environment. The environment may for instance be defined as a geometrical shape, such as for instance a polygonal shape (including a rectangular shape or a triangular shape as a special case) or an elliptical shape (including a circular shape as a special case), to name but a few non-limiting examples.

The monitoring is performed for a position of the set of one or more positions. This does not exclude that one or more of the remaining positions of the set of positions are monitored, for instance after the monitoring of the position for which the monitoring is performed is terminated, but equally well also simultaneously or at least temporally overlapping with the monitoring of the position for which the monitoring is performed.

The position comprised in the report is considered a validation of the position for which the monitoring is performed, if the position is associated with the same coverage area as the position for which the monitoring is performed and if the position comprised in the report is within a defined environment of the position for which the monitoring is performed. Validation of the position for which the monitoring is performed may for instance be required in case the position for which the monitoring is performed may be considered to be potentially not representative of the coverage area. If the positions in the set of one or more positions shall be representative of the coverage area of the communication node (for instance if they shall be within the coverage area of the communication node), for instance because one or more models for the coverage area shall be derived from the set of one or more positions or because the set of one or more positions represents such a model of the coverage area of the communication node, it may be desirable to remove any position from the set of one or more positions that is not representative of the coverage area.

Therein, opportunities for the validation may for instance be bound to a temporal limit, for instance in a way that the position for which the monitoring is performed is to be removed from the set of one or more positions if no report with a position within the defined environment of the position for which the monitoring is performed and being associated with a time instant that is before a defined time instant is received.

Exemplary embodiments of the present invention may then allow detecting that the coverage area shrinks, changes (e.g. due to changes in the environment, for instance installation of a new building blocking a part of the coverage area), moves and/or disappears. For instance, in case of a shrinking coverage area, positions that were within the old coverage area, but are not inside the new (smaller) coverage area will no longer be validated. In case of a disappearing coverage area, no position will be validated. In case of a moving coverage area, all positions that are not in the intersection between the old coverage area and the new coverage area will no longer be validated, accordingly. In contrast, in case of an increasing coverage area, also positions that were in the old (smaller) coverage area will still be validated, since they are still representative of the coverage area.

According to exemplary embodiments of all aspects of the present invention, the set of one or more positions at least one of represents a model for the coverage area of the communication node and serves as a basis for at least one of generating and updating at least one model for the coverage area of the communication node.

For instance, the positions in the set of one or more positions may be the vertices of a polygon (such as a convex polygon that may for instance represent or parameterize a convex hull) that encloses all positions of one or more terminals that have—for instance via the fingerprints/reports—reported to be within the coverage area (for instance because they are able to hear the communication node) and thus can be considered as a model for the coverage area of the communication node. From this polygon, for instance further models for the coverage area of the communication node (such as for instance elliptical models) may be derived. Therein, the set of one or more positions or the at least one model generated and/or updated based on this set of one or more positions may for instance represent a hard boundary of the coverage area, so that all terminal positions have to be within the hard boundary to be considered to be within the coverage area. Equally well, the set of one or more positions or the at least one model generated and/or updated based on this set of one or more positions may represent a soft statistical boundary that is for instance based on a statistical model for the distribution of the terminal positions in the coverage area (e.g. a 2D Gaussian distribution) and may be characterized by further parameters such as for instance a confidence value. The set of one or more positions or the at least one model generated and/or updated based on this set of one or more positions may then be considered to be representative of the coverage area even if the soft statistical boundary does not enclose all terminal positions within the coverage area.

According to exemplary embodiments of all aspects of the present invention, the monitoring for the position is triggered by a decision that the position for which the monitoring is performed is a potential outlier with respect to the coverage area of the communication node. The monitoring may then be performed to determine whether the position for which the monitoring is performed is an outlier or not.

According to exemplary embodiments of all aspects of the present invention, the monitoring for the position is triggered by a decision that the position for which the monitoring is performed is potentially outdated. The monitoring may then be performed to determine whether the position for which the monitoring is performed is indeed outdated or not.

According to exemplary embodiments of all aspects of the present invention, the monitoring for the position can be triggered by both a decision that the position for which the monitoring is performed is a potential outlier with respect to the coverage area of the communication node and a decision that the position for which the monitoring is performed is potentially outdated.

Therein, an outlier may for instance be defined as a position that is too far apart from the coverage area of the communication node, for instance since it has a distance with respect to the coverage area that is above a distance threshold. An outlier may for instance occur when a terminal that is actually within the coverage area measures or reports its position erroneously. A position may be classified as a potential outlier if it is considered to be too far apart from the assumed coverage area of the communication node, for instance since it has a distance with respect to the assumed coverage area that is above a distance threshold, wherein the assumed coverage area of the communication node may for instance be represented by a model for the coverage area. Monitoring may then reveal if the potential outlier is indeed an outlier (e.g. erroneously measured/reported) or not (for instance since the coverage area has moved).

The decision that the position for which the monitoring is performed is a potential outlier with respect to the coverage area of the communication node may be based on at least one model for the coverage area of the base. The at least one model may for instance have been generated and/or updated based on the set of one or more positions or based on a previous version of the set of one or more positions. The previous version of the set of one or more positions may for instance differ from a current version of the set of one or more positions in the position for which the monitoring is performed only, or also in further positions.

A position may for instance be considered to be outdated if it is no longer representative of the coverage area, for instance if it is no longer within the coverage area. This may for instance occur when a coverage area shrinks, moves or disappears after a position has been reported. A position may be considered to be potentially outdated if it has exceeded a certain age.

The decision that the position for which the monitoring is performed is potentially outdated may be based on a time instant associated with the position for which the monitoring is performed. This time instant may for instance be represented by a timestamp. The time instant may for instance denote a time when a report that comprised the position was generated or reported by a terminal or received by a unit, for instance by an apparatus that performs the monitoring, or added to the set of one or more positions. This time instant may be updated each time a position is validated in monitoring. The decision that the position for which the monitoring is performed is potentially outdated may for instance be made by comparing this time instant against a current time instant and deciding that the position is potentially outdated if the time difference is above a defined threshold, which may for instance be pre-defined or dynamically controlled, for instance in dependence on at least one of an amount and a rate of incoming reports for the coverage area. Therein, the rate and/or the amount of incoming reports may refers to a single coverage area only, but equally well also to more than one coverage area; it may for instance be an average or any other function of the rate and/or amount of incoming reports of several coverage areas (for instance the coverage areas of several base stations). With respect to the amount and/or rate of incoming reports, it may be differentiated different time periods, for instance different times of a year. The threshold may for instance be controlled based on the amount and/or rate of incoming reports, and in this control, the current time of the year may be considered. As an exemplary example, in a skiing ressort, there will be a higher amount and/or rate of incoming reports in winter as compared to summer, so that it is advantageous to consider this when controlling the threshold.

The time instant on which the decision that the position for which the monitoring is performed is potentially outdated is based may also represent the expiration of a timer that is started when a report that comprised the position is received by a unit, for instance by an apparatus that performs the monitoring, or added to the set of one or more positions, and which timer may be re-started each time a position is validated in monitoring. A position may then for instance be considered to be potentially outdated each time the timer expirers.

The decision that the position for which the monitoring is performed is potentially outdated may be made repeatedly. For instance, the decision may be made periodically. The decision intervals (i.e. the time between two decisions) may be fixed or variable, for instance to allow controlling of a frequency of the monitoring. This may allow trading the amount of computation against the delay in reacting to changes in the coverage area. The decision intervals may for instance depend on an amount of reports and/or on a frequency of reception of reports with positions associated with the coverage area, and may for instance be at least initially adjusted (or continuously adapted) accordingly. For instance, positions associated with coverage areas for which a lot of reports are received may have shorter decision intervals than positions associated with coverage areas for which only few reports are received. For instance, coverage areas with high-traffic may be kept highly updated by using short decision intervals. The decision intervals (e.g. expressed by a timer) may for instance be specific for each position of the set of positions, or may be the same for all positions in the set of points. A first decision interval may for instance be started when a position is received or added to the set of positions. Therein, control of the decision intervals in dependence of the amount of reports and/or in dependence on the frequency of reception of reports may be time-dependent, for instance dependent on a calendar.

According to an exemplary embodiment of all aspects of the present invention, the defined environment has a rectangular or circular shape. Using simple geometrical forms such as a rectangle or a circle may allow performing monitoring with low computational complexity, since it is particularly easy to determine if a position is within a rectangle. Furthermore, such simple geometrical forms may require only little storage space.

In an exemplary embodiment, the method according to the first aspect of the present invention comprises modifying, in case that the report comprising the position associated with the coverage area and lying in the defined environment of the position for which the monitoring is performed is received, information associated with the position for which the monitoring is performed. The processor of the apparatus according to the second aspect of the present invention is accordingly configured to modify information associated with the position for which the monitoring is performed in this case, and the processor of the apparatus according to the third aspect of the present invention comprises according means for modifying the information associated with the position for which the monitoring is performed in this case.

The modifying of the information may for instance comprise at least one of changing and deleting of the information. The modification of the information associated with the position for which the monitoring is performed may for instance serve to indicate that the position for which the monitoring is performed has been validated. The modified information may for instance be written to a storage location or output for further processing, for instance to another unit or device. The information associated with the position for which the monitoring is performed may for instance comprise an indicator that indicates that the position for which the monitoring is performed is currently monitored, and/or a definition of the defined area, and/or a representation of a time instant associated with the position, such as a timestamp, and/or a time instant associated with the position and relating to the monitoring, such as a monitoring expiry time instant. Modification of the information may for instance comprise removing or changing the indicator, for instance to indicate that the position for which monitoring is performed has been validated. Modification of the information may for instance comprise removing the definition of the defined area, for instance to indicate that the position for which monitoring is performed has been validated. Modification of the information may for instance comprise modifying (for instance setting to a predefined value that indicates that no monitoring shall be performed) the time instant relating to the monitoring, for instance to indicate that the position for which monitoring is performed has been validated. Modification of the information may for instance comprise changing the representation of the time instant associated with the position (e.g. a time stamp), for instance updating the representation of the time instant, for instance to a current value, for instance to indicate that the position for which monitoring is performed has been recently validated and thus is not to be considered potentially outdated. Also all combinations of these modification examples are possible.

The modified information may prevent the position for which the monitoring is performed to be one of removed or triggered to be removed from the set of one or more positions by a process that is configured to one of remove and trigger removal of the position for which the monitoring is performed from the set of one or more positions in case that no report comprising a position associated with the coverage area, lying in a defined environment of the position for which the monitoring is performed and being associated with a time instant that is before a defined time instant associated with the position for which the monitoring is performed is received.

The process configured to remove or trigger removal of the position for which the monitoring is performed may for instance be implemented by the same unit (e.g. apparatus or device) that implements the monitoring, or by another unit (for instance a unit that also performs identification of potentially outdated positions). In the latter case, the modified information may be transferred from a unit that implements the monitoring to a unit that implements the process configured to remove or trigger removal of the position for which the monitoring is performed, or for instance stored to a storage location where it can be accessed by the process configured to remove or trigger removal of the position for which the monitoring is performed.

The process may for instance be understood to check if the position for which the monitoring is performed is validated before the defined time instant or not, and to remove the position for which the monitoring is performed if it is not validated before the defined time instant.

Therein, the time instant associated with the position comprised in the report may for instance represent the time when the report was generated or reported by a terminal, or received by a unit (for instance the unit that implements the monitoring or another unit), or added to the set of one or more positions. The time instant may for instance be represented by a timestamp.

The defined time instant may for instance define the time instant at which monitoring for the position should be terminated and the position for which the monitoring is performed should be removed from the set of one or more positions, if the position has not been validated. Therein, if the time instant associated with the position comprised in the report for instance represents the time the report was received by the unit that performs the monitoring, only reports received before the defined time instant may validate the position for which the monitoring is performed. If the time instant associated with the position comprised in the report for instance represents the time the report was generated (e.g. the data was collected and assembled) at the terminal, even reports received after the defined time instant (but generated before) may validate the position for which the monitoring is performed.

The process may for instance be prevented from removing or triggering removal of the position for which the monitoring is performed because the modified information indicates to the process that the position has been validated in monitoring, or that the position is currently not monitored. This may for instance be accomplished if the information associated with the position for which the monitoring is performed comprises an indication (such as a flag (e.g. a 1-bit word) that indicates if monitoring is performed for a position or not, and if the modification of this information comprises deleting this indication. The process is then informed that there is no or no longer a monitoring for the position and therefore no need to check if the position may have to be removed due to lack of validation before the defined time instant. Equally well, the presence of a definition of the defined area and/or the defined time instant in the information associated with the position for which the monitoring is performed may serve the purpose of indicating that monitoring is performed for a position or not, and its removal in case of validation may then inform the process that there is no or no longer a monitoring for this position. As a further example, characteristic values for the parameters defining the defined environment and/or the defined time instant may be used to indicate that no monitoring is performed for a position. An example of such a characteristic value is a 0 assigned to a defined time instant to indicate that no monitoring is performed, and by changing a defined time instant from a non-zero value to zero, it may be indicated to the process that the position has been validated.

The defined time instant may be an absolute time instant or a relative time instant. It may for instance be defined before or when monitoring of the position is started or triggered. It may for instance be obtained by adding a time interval, for instance a pre-defined time interval, to a time instant, for instance to a time instant at which it is determined that the position for which the monitoring is performed should be monitored (or at which monitoring starts), or a time instant at which the report that comprised the position for which the monitoring is performed was generated, reported, received, added to the set of one or more positions or at which the position was last validated. The time interval may be fixed or variable, it may for instance be adjustable, for instance to control the amount of processing required for monitoring. The length of this time interval (which may for instance be understood to represent the duration of monitoring) may for instance depend on an amount of reports received for the coverage area and/or a frequency of reception of reports for the coverage area. For instance, positions associated with coverage areas for which a lot of reports are received may have shorter durations of monitoring than positions associated with coverage areas for which only few reports are received. The time interval may for instance be the same for all positions in the set of one or more positions, or may be different for at least two positions in the set. Therein, control of the length of the time interval in dependence of the amount of reports and/or in dependence on the frequency of reception of reports may be time-dependent, for instance dependent on a calendar.

Also the defined time instant may for instance be the same for all positions in the set of one or more positions, or may be different for at least two (or even all) positions in the set. It may for instance be specific for the position for which the monitoring is performed. The defined time instant may for instance be the expiration time of a timer that is started for the position for which the monitoring is performed.

According to an exemplary embodiment of the method according to the first aspect of the present invention, the method further comprises one of removing and triggering removal of the position for which the monitoring is performed from the set of one or more positions if no report comprising a position associated with the coverage area, lying in a defined environment of the position for which the monitoring is performed and being associated with a time instant that is before a defined time instant associated with the position for which the monitoring is performed is received. The processor of the apparatus according to the second aspect of the present invention is then configured to one of remove or trigger removal of the position if no such report is received, and the apparatus according to the third aspect of the present invention comprises means for one of removing or triggering removal of the position if no such report is received. Therein, the time instant associated with the position comprised in the report and the defined time instant have already been described with respect to the previous exemplary embodiment. In the present exemplary embodiment, monitoring thus may be understood to also comprise a checking if the defined time instant has passed, and if the defined time instant has passed without the position for which the monitoring is performed being validated, the position is removed from the set of one or more positions or its removal from the set of one or more positions is triggered According to exemplary embodiments of all aspects of the present invention, in case of removal of the position for which the monitoring is performed from the set of one or more positions, at least one model for the coverage area of the communication node is updated based on the set of one or more positions excluding the removed position. The updating may for instance be explicitly triggered, or may be performed automatically when the set of one or more positions changes.

According to an exemplary embodiment of the method according to the first aspect of the present invention, the method further comprises terminating monitoring for the position in case that a report comprising a position associated with the coverage area and lying in a defined environment of the position for which the monitoring is performed is received. The processor of the apparatus according to the second aspect of the present invention may be configured to terminate monitoring accordingly, and the apparatus according to the third aspect of the present invention may comprise means for terminating the monitoring accordingly. Since monitoring consumes computation resources, it may be advantageous to stop monitoring as soon as the position for which the monitoring is performed has been validated. Termination of the monitoring may for instance be accomplished by modifying information associated with the position for which the monitoring is performed, for instance by deleting an indicator that indicates if monitoring shall be performed for a position, and/or by deleting a definition of the defined environment for the position and/or by deleting a time instant relating to the monitoring or by setting this time instant to a pre-defined value.

According to an exemplary embodiment of the method according to the first aspect of the present invention, the method further comprises updating a time instant associated with the position for which the monitoring is performed in case that a report comprising a position associated with the coverage area and lying in a defined environment of the position for which the monitoring is performed is received. The processor of the apparatus according to the second aspect of the present invention may be configured to update the time instant accordingly, and the apparatus according to the third aspect of the present invention may comprise means for updating the time stamp accordingly. The time instant may for instance be represented by a timestamp. The time instant may for instance (originally) denote a time when a report that comprised the position was generated or reported by a terminal or received by a unit, for instance by a unit (such as an apparatus or a device) that performs the monitoring, or added to the set of one or more positions. The time instant may for instance be updated with a time instant that indicates when the position comprised in the report was received, or with a time instant that indicates when the position comprised in the report was generated or reported.

Therein, the monitoring for the position may be triggered by a decision that the position for which the monitoring is performed is potentially outdated, and the decision may be based on the time instant associated with the position for which the monitoring is performed. The updating of the time instant associated with the position for which the monitoring is performed thus affects the (potentially later) decision if the position is potentially outdated.

According to an exemplary embodiment of the method according to the first aspect of the present invention, the method further comprises one of adding and triggering addition of the position comprised in the report to the set of one or more positions and to one of updating and triggering updating of at least one model for the coverage area of the communication node based on the set of one or more positions including the added position in case that a report comprising a position associated with the coverage area and lying in a defined environment of the position for which the monitoring is performed is received. The processor of the apparatus according to the second aspect of the present invention may be configured to one of add and trigger addition of the position to the set of one or more positions, and to one of update or trigger updating of the at least one model, accordingly. The apparatus according to the third aspect of the present invention may comprise means for one of adding and triggering addition of the position to the set of one or more positions, and means for updating or triggering updating of the at least one model, accordingly.

Adding (or triggering addition of) the position comprised in the report to the set of one or more positions may for instance be advantageous if the position for which monitoring is performed is a potential outlier, since it may then be the case that the coverage area has moved and it may then be valuable to have the position comprised in the report (in addition to the position for which the monitoring is performed) as a basis for an updating of the one or more models for the coverage area of the communication node.

Equally well, if the position for which the monitoring is performed is validated by a position comprised in a report, the position comprised in the report may only be added (or triggered to be added) to the set of one or more positions if it is not already covered by at least one model for the coverage area of the communication node, wherein the model may for instance have been generated and/or updated based on a set of positions before the monitoring, for instance based on a previous version of the set of positions. Furthermore, updating of at least one model for the coverage area of the communication node (e.g. at least the at least one model for the coverage area of the communication node which does not cover the position comprised in the report) based on the set of one or more positions including the position comprised in the report may then be triggered or performed.

Equally well, if the position for which the monitoring is performed is validated by a position comprised in a report, and if the position comprised in the report is not already covered by at least one model for the coverage area of the communication node, the position for which the monitoring is performed may be replaced by the position comprised in the report (or its replacement may be triggered). Furthermore, updating of at least one model for the coverage area of the communication node (e.g. at least the at least one model for the coverage area of the communication node which does not cover the position comprised in the report) based on the set of one or more positions including the position comprised in the report may then be triggered or performed.

According to an exemplary embodiment of all aspects of the present invention, for at least two positions in the set of positions, the monitoring is not performed at the same time. This may allow reducing the peak computational power that has to be provided by a system that performs the monitoring, and thus allows deploying less powerful and thus less expensive monitoring hardware (e.g. a less expensive processor). For instance, (equal) timers used for making a decision if positions in the set of one or more positions are potentially outdated may be started with different offsets for each position in the set of one or more positions. The offsets may for instance be random offsets or different multiples of the same base time unit. Equally well, the timers itself may be random timers or different multiples of the same base time unit.

It is to be noted that the above description of embodiments of the present invention is to be understood to be merely exemplary and non-limiting. Furthermore, the exemplary embodiments described above and in particular their single features shall be understood to be disclosed in all possible combinations with each other.

These and further aspects of the invention will be apparent from and elucidated with reference to the detailed description presented hereinafter.

DETAILED DESCRIPTION OF EXEMPLARY EMBODIMENTS OF THE INVENTION

Figure 1:
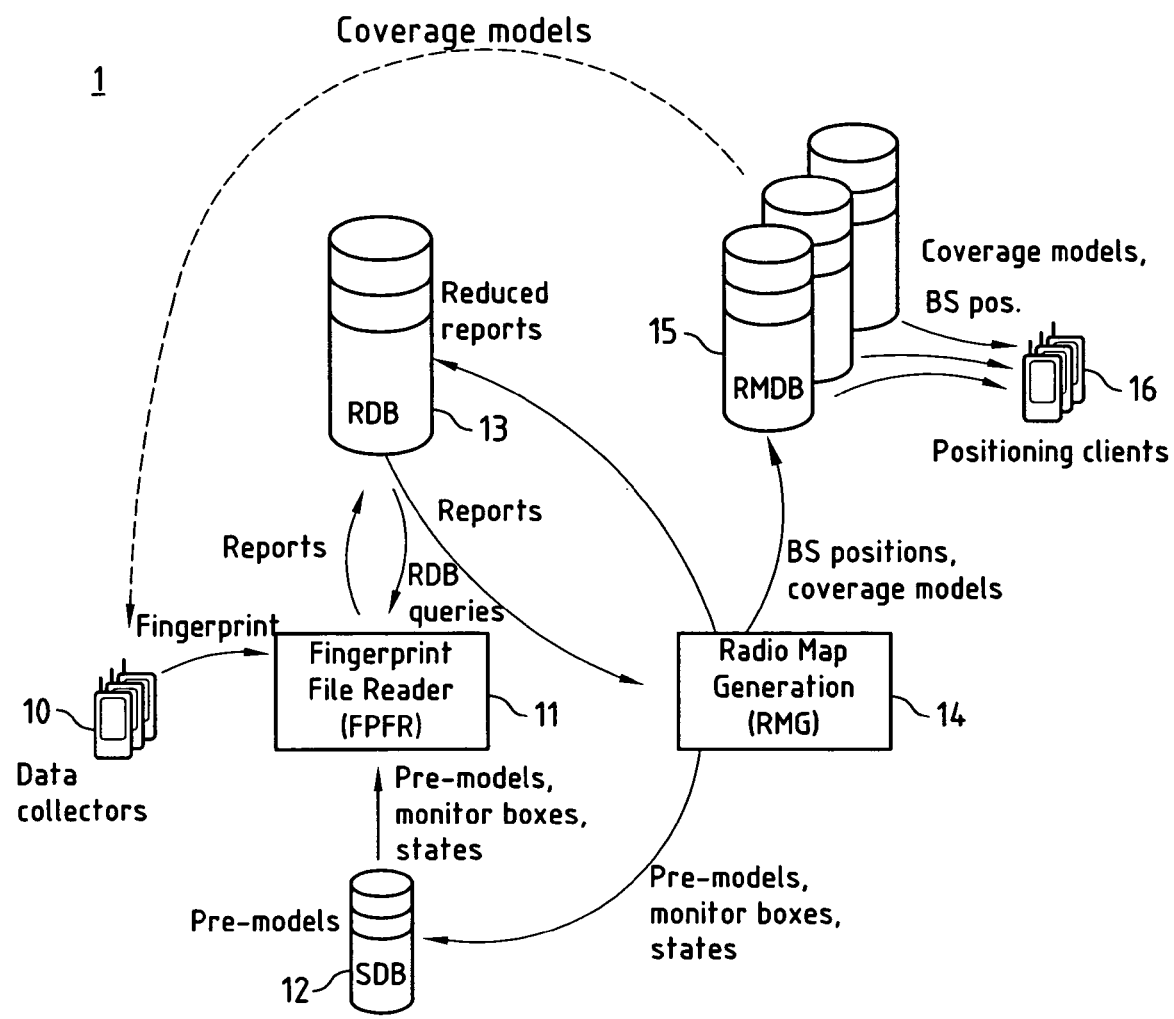
FIG. 1: A schematic block diagram of an exemplary system that implements exemplary aspects of the present invention.

Satellite positioning does not work well indoors or in other shadowed environments. However, various communication nodes are ubiquitous in the modern world.

Non-limiting examples of such communication nodes include cellular base stations, WLAN access points, FM radio or TV stations. Instead of the term "communication node", also the term "base station" will be used in the following description, wherein the term "base station" is not necessarily understood to be restricted to a cellular base station. These base stations have good penetration and coverage virtually everywhere of interest. Since the range of these beacons may usually be relatively short (for instance hundreds of meters to some kilometers), these beacons may be exploited for positioning purposes.

For instance, WLAN-based positioning may complement Global Navigation Satellite System (GNSS) based positioning in urban environments. Typically GNSS-based positioning methods have problems in urban canyons—however, these are also areas, in which the WLAN Access Point density is high. WLAN-positioning also enables indoor positioning allowing for more effective Location Based Services (LBS).

WLAN Access Points (WLAN APs) can be used for positioning given that the position(s) of the AP(s) are known. In general, WLAN-based positioning assumes a database, either local (in the terminal) or remote (in the server) or a combination of those containing at least WLAN AP identification information (e.g. a WLAN AP Medium Access Control (MAC) address) and the geographical coordinates of the WLAN APs. The database may also contain an estimate of the WLAN AP position accuracy. Moreover, a coverage area may also be modeled.

The database of WLAN APs and their geographical coordinates and/or coverage models allow for positioning the terminal with WLAN. GNSS or some other conventional positioning capability may then not be required.

In positioning, the terminal performs a WLAN AP scan and then compares the scan results to the records in the database. If applicable records are found, the information is combined in some suitable manner (such as, weighted average based on Relative Signal Strength (RSS) values) to produce a position estimate for the terminal.

Therein, if the base station positions are known and distances from the terminal to the base stations can be estimated, the terminal's position can be estimated through triangulation. The distance between a terminal and the heard base stations can be estimated based on either the path loss (i.e. how much the signal attenuates between the terminal and the base station) using a channel model or based on timing (or round-trip timing) measurements (i.e. information expressing how long signals propagate between terminal and base station).

If models for the base station coverage areas are known, then a terminal may pick the coverage areas for the heard base stations and find the intersection of these coverage areas. The terminal can then be assigned a position that is, for instance, the center-of-mass of the intersection area. Moreover, a position error estimate may be given based on the size of the intersection.

These mechanisms may also be combined: distance measurements can be combined with coverage area models to produce a position estimate. Even satellite (GNSS) pseudorange measurements may be taken into account in these hybrid methods to obtain additional measurements.

The database for WLAN-based positioning can be built in various ways. One solution may be that a company buys hotspot directories from WLAN network providers and assimilates these directories in their databases. Alternatively, a plurality of terminals may perform the WLAN AP mapping. In such a case the terminals may have a Global Navigation Satellite System (GNSS) or Assisted GNSS (AGNSS) receiver attached to or inside the terminal and provide data on the WLAN AP's coverage. It may also be the case that the database build-up is a community-based effort.

It is readily understood by a person skilled in the art that the techniques described above in the context of a WLAN system are equally applicable with any other radio network-technology as well. Potential candidates include Bluetooth, Wibree (Ultra Low Power Bluetooth), Global System for Mobile Communication (GSM), Wideband Code Division Multiple Access (WCDMA), Code Division Multiple Access (CDMA), Long Term Evolution (LTE), Worldwide Interoperability for Microwave Access (WiMAX), to name but a few non-limiting examples.

The above-described WLAN-based positioning may also be combined/complemented with Cell ID-based positioning. When collecting the data for the WLAN AP database, also information on 2G (second generation, e.g. GSM) and/or 3G (third generation, e.g. UMTS) cells (or on cells of any other cellular communication system) that can be observed in the present position (serving station and optionally also the neighboring stations) may be collected.

The data collected on WLAN APs and 2G/3G cells can for instance be collected on central servers and distributed to the terminals for position determination.

Systems that receive and analyze the fingerprints from one or more terminals to model a coverage area of a base station may generally easily notice when a coverage area of a base station (i.e. a cell size) grows. But it may be more difficult to notice when the coverage area gets smaller (for instance due to a transmit power reduction of the base station) and/or changes because of radio network re-planning (for instance due to cell IDs being reassigned in the network) and/or because of antenna re-direction (for instance due to a change in the antenna pattern or a physical turning of the antenna).

Exemplary embodiments of the present invention may allow representing the coverage area of a base station even in cases when the coverage area gets smaller or changes in some other way, for instance even by a small amount inside of the cell's assumed maximum size.

This may be relevant because frequently, companies collecting information on the coverage area of the base stations may be different from the companies that maintain (operators) and sell (suppliers) networks. It may be considered the nature of radio networks that they change when more capacity is added or hardware is renewed. Moreover, some fine tuning of the network may constantly take place in cellular networks. In the non-cellular side such as, for instance, WLAN, access points may move all the time, and the radio landscape changes through such changes. In practice this means that companies collecting the information on the coverage area of the base stations may have to detect these changes in the network without getting any kind of information about the change from the operator or the base station owner.

FIG. 1 schematically illustrates the functional blocks of an exemplary system 1 that implements aspects of the present invention.

The server side of the exemplary system 1 comprises two processing blocks, Finger Print (FP) File Reader (FPFR) block 11 and Radio Map Generation (RMG) block 14. Moreover, there are three data stores, Report Data Base (RDB) 13, Screening Data Base (SDB) 12 and Radio Map Data Base (RMDB) 15. Each can be either centralized or, for example, regionally distributed. Moreover, although the exemplary architecture shows several different databases, they can be implemented as one single same database or may be broken down in more databases in different implementations. It is clear to a person skilled in the art that the actual number and naming of databases is an implementation issue and does not affect the concept disclosed in this specification. The terminals 10 acting as data collectors or positioning clients 16 can also be seen as processing blocks of system 1.

The one or more terminals (e.g. mobile terminals) 10 with positioning capacity (e.g. GPS) send a fingerprint, which may for instance include available network measurements for 2G (e.g. GSM) and/or 3G (e.g. UMTS) serving and neighboring base stations as well as for WLAN base stations (access points). The network measurements for instance comprise the base station identification of the base stations heard, but may also include signal strength (Received Signal Strength, RSS) and timing measurements (such as Timing Advance, TA and/or Round Trip Delay), which may be indicative of the range to the base station. The majority of the fingerprints contain one or more estimates of the terminal's position. The fingerprints may further contain one or more timestamps, which may for instance reflect a time instance at which the position is measured and/or the base station is heard, a time instance at which the fingerprint is reported, or a time instance at which the fingerprint is received by FPFR block 11 (or any other unit).

The fingerprint arrives to the FPFR block 11, which splits the information into base-station-specific reports, and stores the base-station-specific reports, which, in the simplest case, are only terminal positions, into the RDB 13. An example of such a report stored in RDB 13 is given in Table 1 below. Therein, it is to be noted that the base station does not necessarily have to be the primary record for storing fingerprints/reports. Equally well, the fingerprints may be stored in a database in a position-specific way, so that the according entries in the database then may pertain to several base stations. The fingerprints may of course also be stored and/or processed according to other criteria.

TABLE 1

| Exemplary Report Format | |
|---|---|
| Parameter | Description |
| ID | Unique ID code of the base station |
| Type | 2G/3G active/neighbour, WLAN, WiMAX, etc. |
| Timestamp | Timestamp |
| Position | Reported position |
| RSS | Received signal strength (if available) |
| Range | Range to base station (if available) |

TABLE 1-continued

| Exemplary Report Format | |
|---|---|
| Parameter | Description |
| | available) |
| Range | Range to base station (if available) |

FPFR block 11 may implement a filter that drops (discards) reports, for instance when they are considered to add no new information to the already collected data. In particular, to be able to deal with the massive number of incoming reports, the FPFR block 11 may for instance make use of simplified pre-models of the coverage area (stored in SDB 12) to be able to quickly drop a large number of redundant reports. Use of these pre-models may depend on the states of a state machine set up for the coverage area.

The RMG block 14 reads (for instance continuously or periodically, or in response to a trigger event, such as an arrival of a new report or an accumulation of a certain amount of reports) reports from the RDB 13, and generates/updates different types of models for the coverage area of the base station. The RMG block 14 may also remove redundant reports from RDB 13, keeping only a small but representative set of reports on the coverage area of each base station. RDB 13 may for instance store a pre-defined number of reports with respect to each base station, and it may be targeted to use as little computation as possible to sieve the significant ones from the mass of incoming reports.

In the exemplary system of FIG. 1, RMG block 14 may exemplarily use a polygon, in particular a convex polygon, to represent the terminal positions that are reported by the one or more terminals 10, pass the FPFR block 11 and are at least temporarily stored (in the form of reports) in RDB 13. That is, instead of storing all terminal positions received from FPFR block 11 in RDB 13, only the terminal positions that form the vertices of a convex polygon that encloses all these terminal positions are stored. This convex polygon may for instance represent or parameterize a convex hull that encloses all terminal positions. The maximum number of vertices of this convex polygon may be limited to some pre-defined value. If the number of vertices of the first convex polygon exceeds this maximum number, vertices of the convex polygon may be merged to form a second convex polygon with increased area as compared to the first convex polygon in a way that still all reported terminal positions are within the polygon.

This is accomplished by RMG block 14 by overwriting the reports in the RDB 13 with a reduced set of reports (or just deleting unnecessary ones), i.e. those reports that are associated with the terminal positions that form the polygon (i.e. its vertices). Nevertheless, depending on the monitoring of the border terminal positions/reports (i.e. the vertices of the polygon), also interior terminal positions/reports (i.e. terminal positions/reports within the polygon) may be stored in RDB 13.

Figure 2:
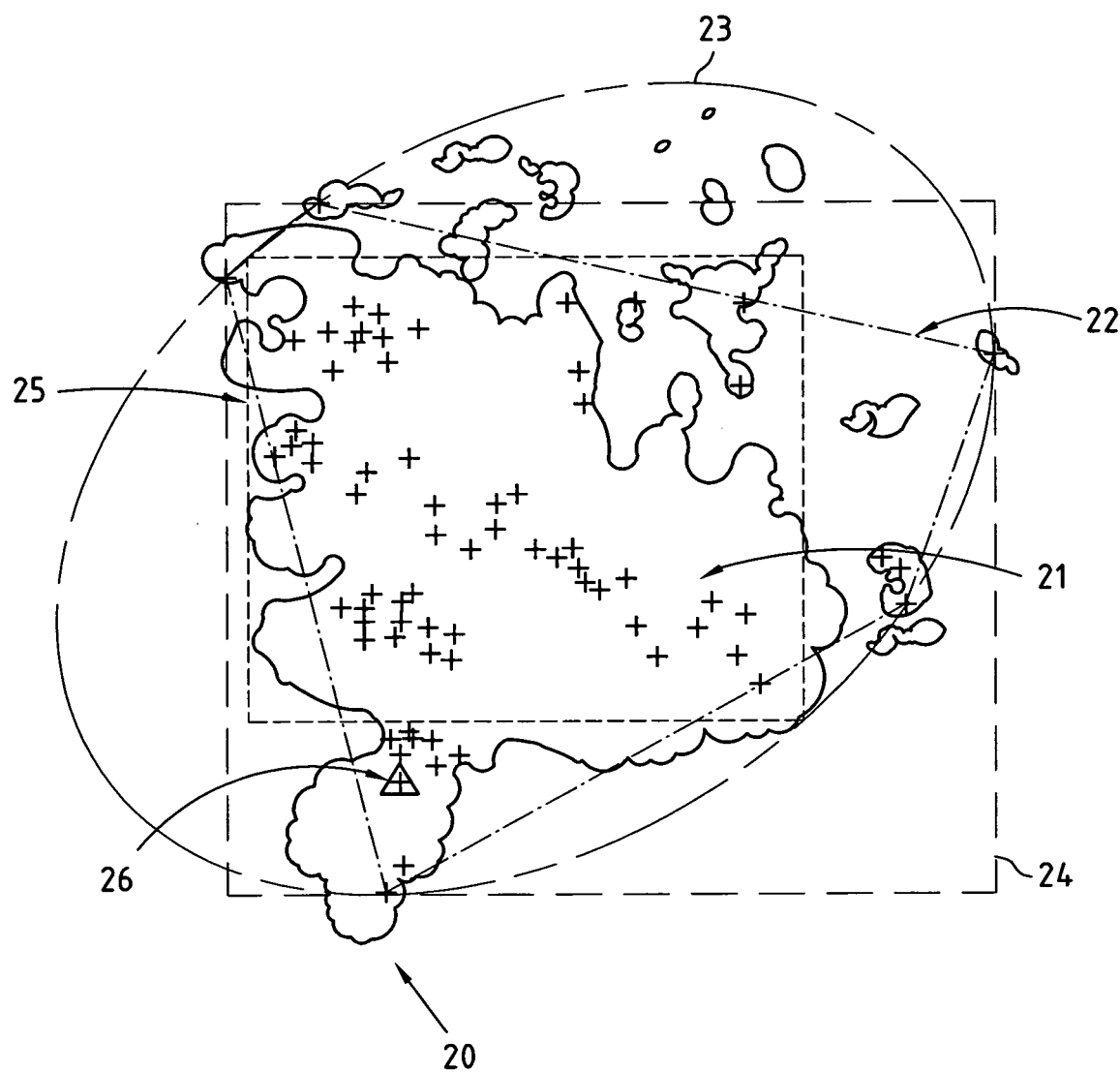
FIG. 2: a schematic illustration of an exemplary coverage area of a base station with exemplary models for this coverage area.

An example of a convex polygon 22 (in this case a convex hull) enclosing the terminal positions 21 in a coverage area 20 of a base station 26 is given in FIG. 2.

In addition to the polygon 22, the RMG block 14 further generates/updates a coverage model and different pre-models based on this polygon 22, as will be described now.

All of these models (including the polygon) are models for the coverage area of the base station. In the following, models for the coverage area of the base station that are to be provided to the positioning terminals 16 (see FIG. 1) will be denoted as "coverage models", whereas the models for the coverage area of the base station that are provided to FPFR 11 and stored in SDB 12 will be denoted as "pre-models". These models may represent both "hard" and "soft" (e.g. statistical) boundaries for the coverage area, as further explained below.

An elliptical coverage model is generated by RMG block 14 by fitting the minimum enclosing ellipse around the polygon 22 (see for instance ellipse 23 enclosing convex hull 22 in FIG. 2). When updating this ellipse, the old ellipse may be used as the initial guess.

The following two ellipse formats are exemplarily used in this specification:

An "axis/angle-form" ellipse, defined by coordinates of the centre (in World Geodetic System WGS-84) longitude and latitude, lengths of the semi-major and semi-minor axes (in meters, referring to WGS-84 coordinates), and orientation of the semi-major axis (degrees, clock-wise from North). Moreover, a confidence value can be included as well. If the ellipse is interpreted in a statistical sense, i.e. to represent a soft statistical boundary for the positions in the coverage area rather than a hard boundary that includes all positions in the coverage area, the confidence value may specify which area with respect to the coverage area the ellipse describes. For instance, if the positions are assumed to be statistically distributed in the coverage area according to a 2D Gaussian distribution, the confidence value may for instance express if the ellipse represents the $\sigma$, $2\sigma$ or $3\sigma$ area of the 2D Gaussian distribution, wherein $\sigma$ is the standard deviation. Therein, the $\sigma$, $2\sigma$ and $3\sigma$ areas may for instance be understood as the areas in which 39%, 86% and 99% of the terminal positions are considered to be within, respectively.

A "matrix-form" ellipse: coordinates (WGS-84) of the centre $c=(lat_E, lon_E)$, and three coefficients $a>0$, $d>0$, and $b$ so that point $x=(lat, lon)$ is inside the ellipse if $$(x-c)^T A(x-c) \leq 1$$

with $$A = \begin{bmatrix} a & b \\ b & d \end{bmatrix}.$$

The matrix-form ellipse may require more memory space for storage, but may be faster to manipulate than the axis/angle-form ellipse. Similar to the axis/angle-form ellipse, also the matrix-form ellipse may represent a soft statistical boundary for the positions in the coverage area rather than a hard boundary that includes all positions in the coverage area. For instance, the centre c may then be interpreted as the mean value and the matrix A may then be interpreted as the covariance matrix, for instance of a 2D Gaussian distribution assumed for the distribution of the positions in the coverage area. The ellipse may then no longer coincide with the outer boundary of the coverage area, it may rather define a sub-area of the coverage area, for instance the $\sigma$ area.

Details on conversion between the two axis/angle-form ellipse and the matrix-form ellipse are given in Appendix A.1.

In the following, for the sake of simplicity of presentation, it is exemplarily assumed that all coverage models and all pre-models represent "hard" boundaries of the coverage area.

In the exemplary system of FIG. 1, an elliptical model in axis/angle form or a model derived from it (for instance by adding further parameters) serves as coverage model and is saved in RMDB 15, for instance in the format shown in Table 2. The coverage models (for one or more base stations) stored in RMDB 15 are then delivered to terminals 16 to be used for positioning on their own or combined to other positioning data in the terminals 16.

TABLE 2

Exemplary coverage model entry in the RMDB

| Parameter | Description |
|---|---|
| ID | Unique ID code of the base station |
| Type | 2G, 3G, WLAN, etc. |
| State | State from SDB |
| Position | Base station position (if available) |
| Coverage model | Coverage model, e.g. a model comprising the parameters of the axis/angle-form ellipse and optionally further parameters |

Furthermore, an elliptical model in matrix-form serves as a pre-model. As further exemplary pre-models, an outer box model 24 (see FIG. 2) is formed from the minimum and maximum coordinates of the ellipse 23, so that all reports so far are inside the outer box 24, and an inner box model 25 is formed as the maximal box fitted inside the ellipse 23, so that reports inside the inner box 25 do not change the ellipse 23. All of these pre-models are stored in SDB 12, for instance in the format shown in Table 3.

TABLE 3

Exemplary SDB entry

| Parameter | Description |
|---|---|
| ID | Unique ID code of the base station |
| timestamp | time when pre-models were last modified |
| Type | 2G, 3G, WLAN, etc. |
| State | State of the state machine for the coverage area |
| monitorBox | Monitoring boxes |
| monitorExp | Monitoring expiry timestamps |
| InnerBox | Pre-model (min/max/lat/lon) |
| OuterBox | Pre-model (min/max/lat/lon) |
| Ellipse | Pre-model (matrix-form) |

Figure 3:
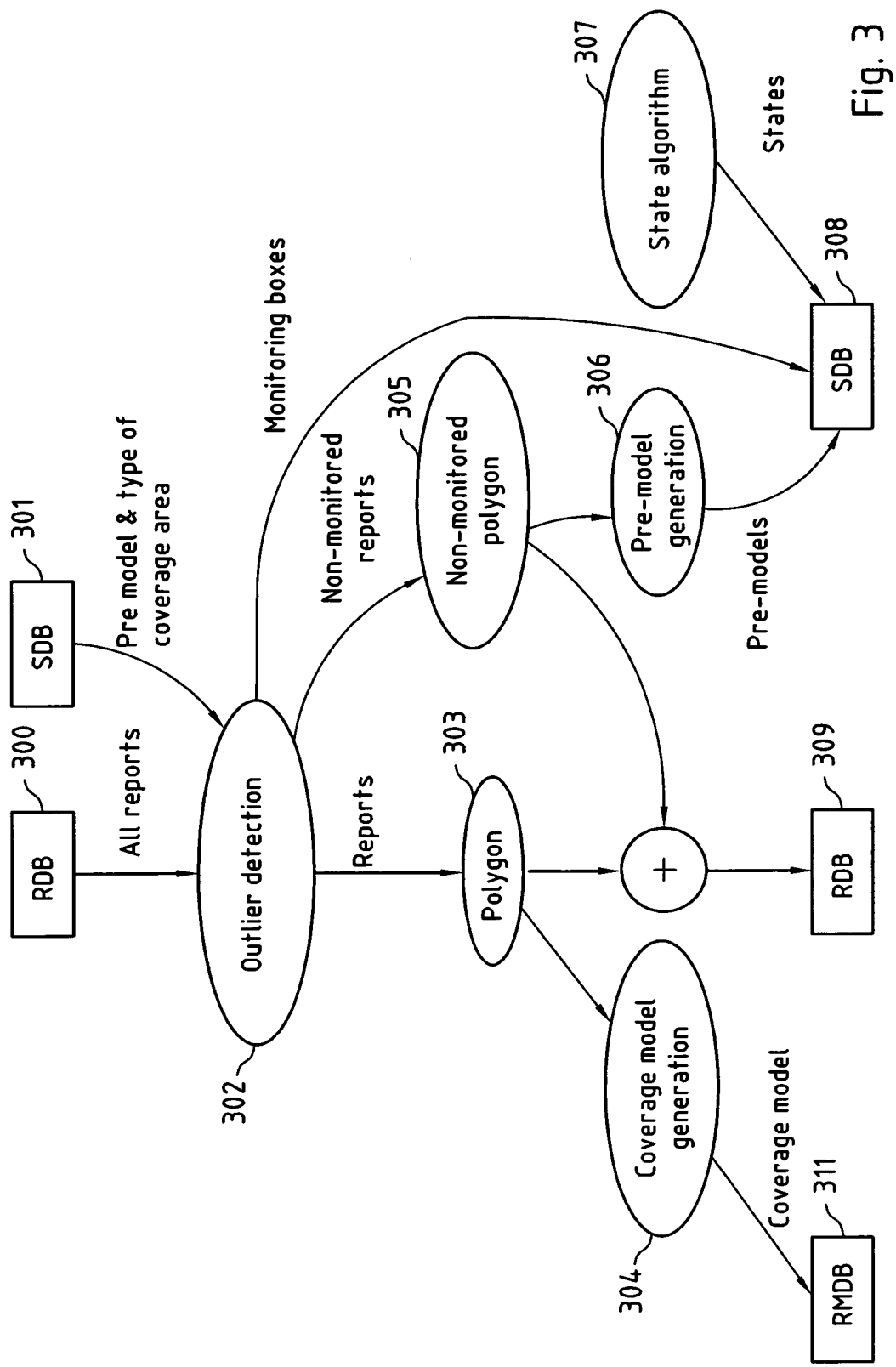
FIG. 3: a schematic block diagram of an exemplary embodiment of a process for generating and/or updating models for the coverage area of a base station according to the present invention.

FIG. 3 is a schematic illustration of an example of the generation of a polygon serving as a representation of the coverage area of a base station and the coverage model and pre-models derived from this polygon.

Therein, block 302 performs detection of potential outliers. This detection is based on pre-models and/or information on the type of coverage area to be determined, for instance the maximum possible radius of the coverage area, which may for instance be stored in SDB 301 (corresponding to SDB 12 of FIG. 1). The concept of detecting potential outliers will be explained in further detail with reference to FIG. 9 below.

For all reports contained in RDB 300 (corresponding to RDB 13 of FIG. 1), a polygonal representation is determined in block 303. This polygon is then input into block 304, where a coverage model is generated from the polygon, and this coverage model is then stored in RMDB 311 (corresponding to RMDB 15 of FIG. 1).

For all currently non-monitored reports (i.e. for those reports that are neither suspected to be outliers nor suspected to be outdated, which will also be explained in more detail below with reference to FIGS. 8a and 8b, so that no monitoring is performed for them), a non-monitored polygon is determined in block 305, and this non-monitored polygon serves as a basis for pre-model generation in block 306. This way, inter alia, in a case of potential outliers, the optimal polygons both including and excluding the potential outliers can be maintained. This arrangement may ensure that if some of the monitored vertices are removed, there are vertices in reserve (i.e. vertices in the vicinity of the monitored vertices that are not discarded in screening since the pre-models used in screening are based on the non-monitored polygon) to produce a good coverage model.

The pre-models output by block 306 are then stored in SDB 308 (corresponding to SDB 12 in FIG. 1). SDB 308 further stores monitoring boxes (as will be explained in more detail below) set by block 302. Finally, SDB 308 further may store states of a state machine determined by a state algorithm 307.

The reports of the polygon determined in block 303 and of the non-monitored polygon determined in block 305 are stored back to RDB 309 (corresponding to RDB 13 in FIG. 1).

Each of blocks 303, 304, 305 and 306 in FIG. 3, or some or all of these blocks taken together, may be considered to represent a generating/updating process that generates and/or updates at least one model for the coverage area of a base station. The functionality of all blocks 303, 304, 305 and 306 taken together is referred to as RMG process in this specification.

Figure 4:
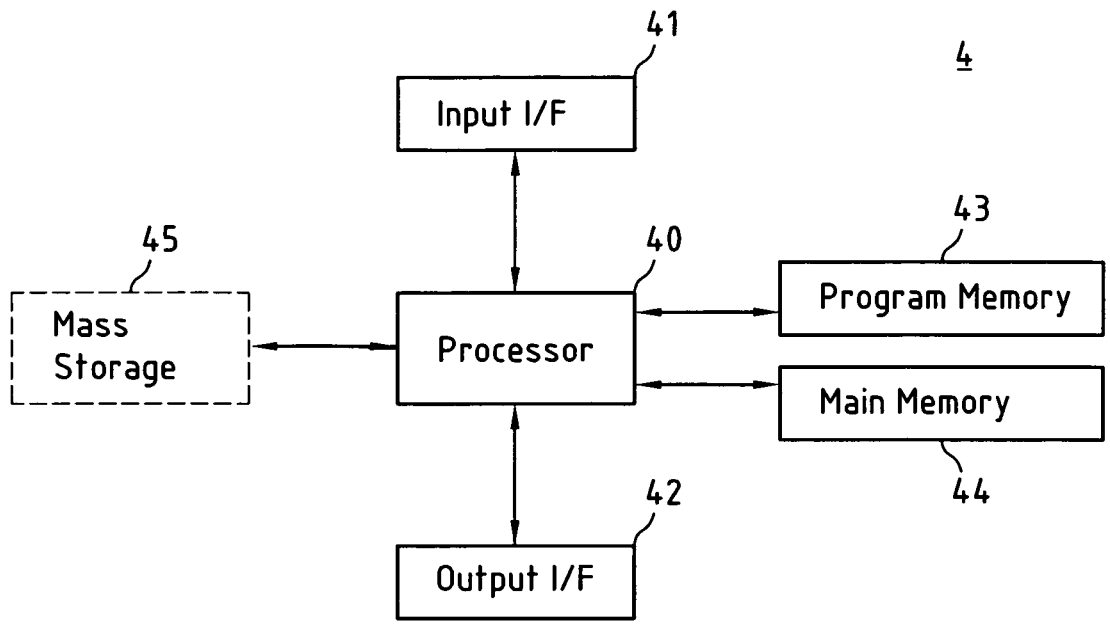
FIG. 4: a schematic block diagram of an exemplary embodiment of an apparatus according to the present invention.

FIG. 4 is a schematic illustration of an exemplary embodiment of an apparatus 6 according to the present invention. The apparatus 6 comprises a processor 40, which communicates with input interface 41, output interface 42, program memory 43, main memory 44 and optionally with mass storage 45.

Processor 40 is configured to implement at least functionality to monitor, for a position of a set of one or more positions that are associated with a coverage area of a base station, if a report comprising a position associated with the coverage area of the base station and lying in a defined environment of the position for which the monitoring is performed is received as a validation of the position for which the monitoring is performed. To this end, processor 40 may for instance run a computer program with program code for monitoring, for a position of a set of one or more positions that are associated with a coverage area of a base station, if a report comprising a position associated with the coverage area of the base station and lying in a defined environment of the position for which the monitoring is performed is received as a validation of the position for which the monitoring is performed. This computer program may for instance be stored in program memory 43, which may be fixedly attached in apparatus 4 or may be a removable memory. Main memory 44 is used by processor 40 as a working memory, for instance to store intermediate results and variables.

Processor 40 may be understood to comprise at least one functional block, in particular a monitoring block that implements the monitoring described above. It may optionally comprise further functional blocks, such as for instance a block that is configured to check if a defined time instance associated with the position for which the monitoring is performed has passed, and/or a block that is configured to modify information that is associated with the position for which the monitoring is performed (such as for instance a time instant (e.g. a timestamp), an indicator that indicates that monitoring is performed for the position and/or a definition of the defined area (e.g. a monitoring box)), and/or a block that is configured to remove or trigger removal of the position for which the monitoring is performed from the set of one or more positions, and/or a block that is configured to update or cause updating of at least one model for the coverage area of the base station based on the (possibly modified) set of one or more positions.

Input interface 41 is configured to allow obtaining information from another unit. This information comprises information useable for the monitoring, such as for instance reports comprising positions associated with the coverage area (optionally with further information such as for instance timestamps, etc.), and information on the defined environment of the position for which the monitoring is performed (e.g. monitoring boxes). Optionally, also information on a defined time instant associated with the position for which the monitoring is performed may be received, if the processor 40 of apparatus 4 is further configured to check if a defined time instance associated with the position for which the monitoring is performed has passed. Also the set of one or more positions may exemplarily (in parts or as a whole) be received via input interface 41, if it is maintained by apparatus 4.

Similarly, output interface 42 is configured to allow outputting of data resulting from the monitoring to another unit, such as for instance modified information associated with the position for which the monitoring is performed (such as for instance an updated timestamp and/or a deleted indicator indicating that monitoring shall be performed and/or a deleted monitoring box) and/or a deleted monitoring expiry time), and/or commands to cause removal of the position for which monitoring is performed from the set of one or more positions. If the set of one or more positions is maintained by apparatus 4, output interface 42 may also be configured to output a reduced set of positions in case of removal of the position for which the monitoring is performed or to output information on the removal of the position for which the monitoring is performed.

Optional mass storage 45, if present, may for instance store information on the defined environment of the position for which the monitoring is performed and optionally information on the defined time instant associated with the position for which the monitoring is performed. It may for instance store this information for all positions associated with a coverage area for which monitoring is performed, or also the information for all positions associated with several coverage areas for which monitoring is performed. Mass storage may further store the set of one or more positions (and also their associated information), if they are maintained by apparatus 4, and may also store the respective sets of one or more positions associated with several coverage areas.

Apparatus 4 may for instance be entirely implemented as a module that may for instance be integrated into a server. Apparatus 4 may for instance be entirely implemented as a circuit on a semiconductor chip. Apparatus 4 may for instance be entirely implemented on a Digital Signal Processor (DSP), Application Specific Integrated Circuit (ASIC) or Field Programmable Gate Array (FPGA), to name but a few examples.

Figure 5:
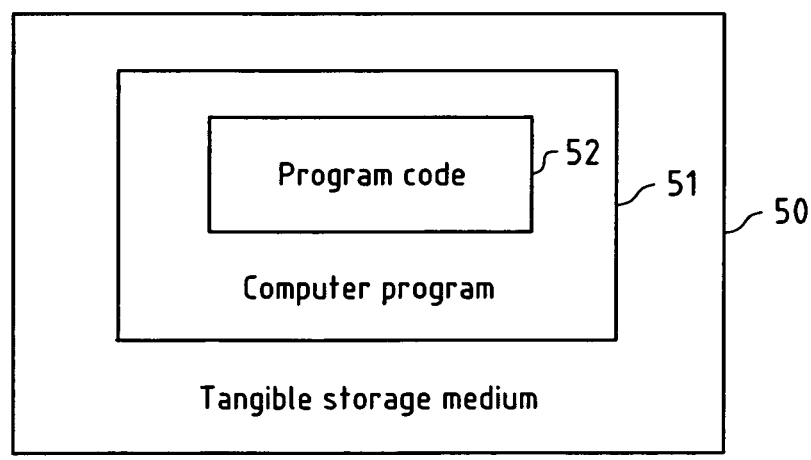
FIG. 5: a schematic illustration of an exemplary embodiment of a tangible storage medium according to the present invention.

FIG. 5 is schematic illustration of an exemplary embodiment of a tangible storage medium 50 according to the present invention. Tangible storage medium 50 may for instance store a computer program 31 with program code 52 for monitoring, for a position of a set of one or more positions that are associated with a coverage area of a base station, if a report comprising a position associated with the coverage area of the base station and lying in a defined environment of the position for which monitoring is performed is received as a validation of the position for which the monitoring is performed. Tangible storage medium 30 is a readable medium, for instance a computer-readable or processor-readable medium. Accordingly, the computer program 51 stored on tangible storage medium 50 may be executable by a computer or a processor. Tangible storage medium 50 may for instance be embodied as an electric, magnetic, electro-magnetic, optic or other tangible storage medium, and may either be a removable medium or a medium that is fixedly installed in an apparatus or device, such as for instance apparatus 4 of FIG. 4.

Figure 6A:
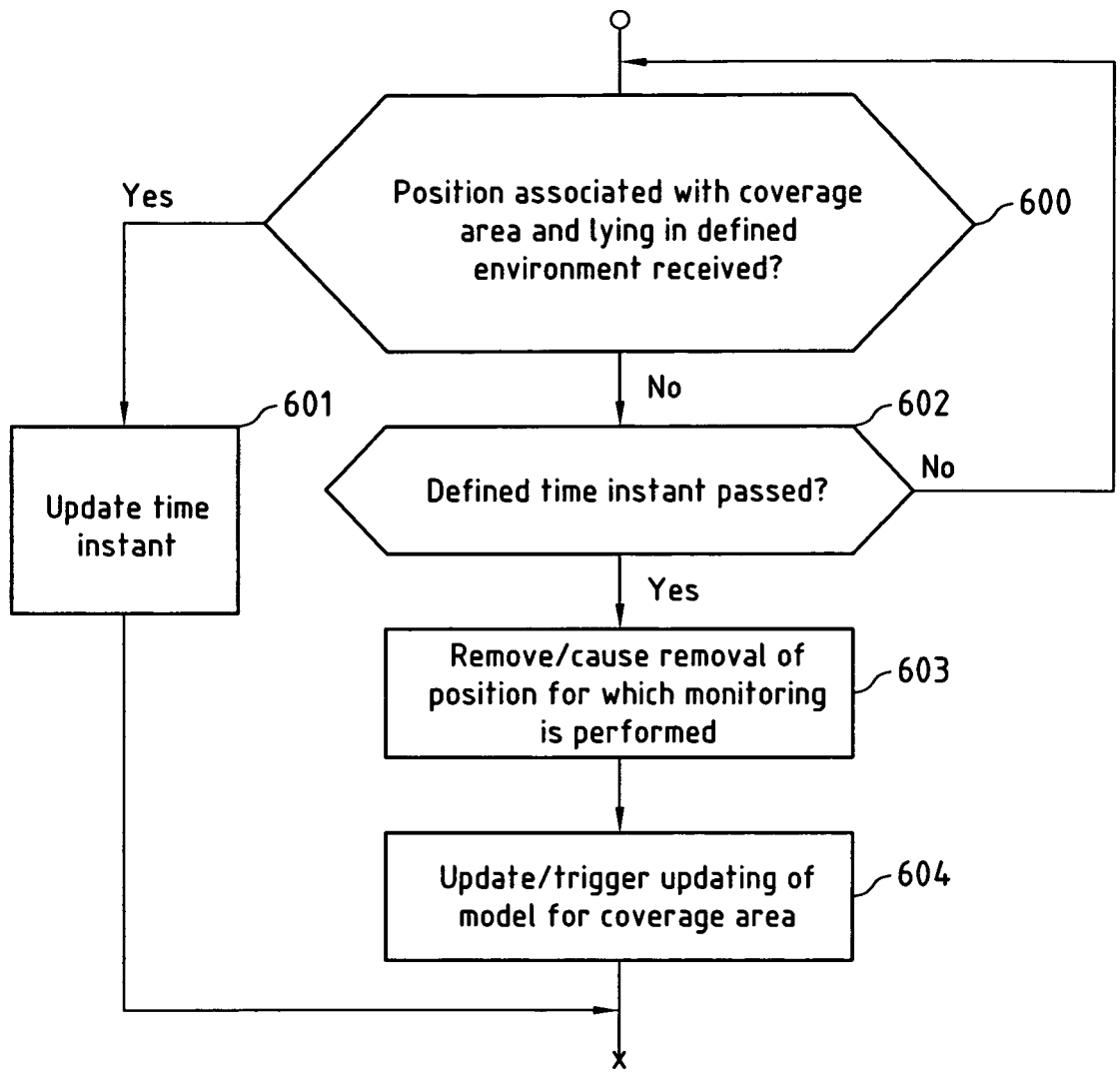
FIG. 6*a*: a flowchart of an exemplary embodiment of a method for monitoring and checking if a defined time instant has passed according to the present invention.
Figure 6B:
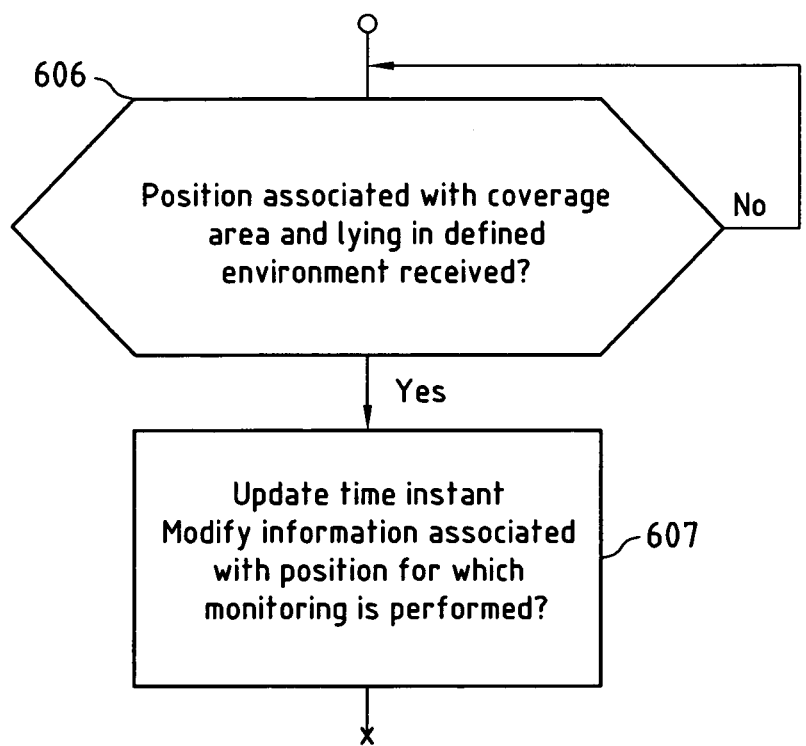
FIG. 6*b*: a flowchart of an exemplary embodiment of a method for monitoring according to the present invention.
Figure 7A:
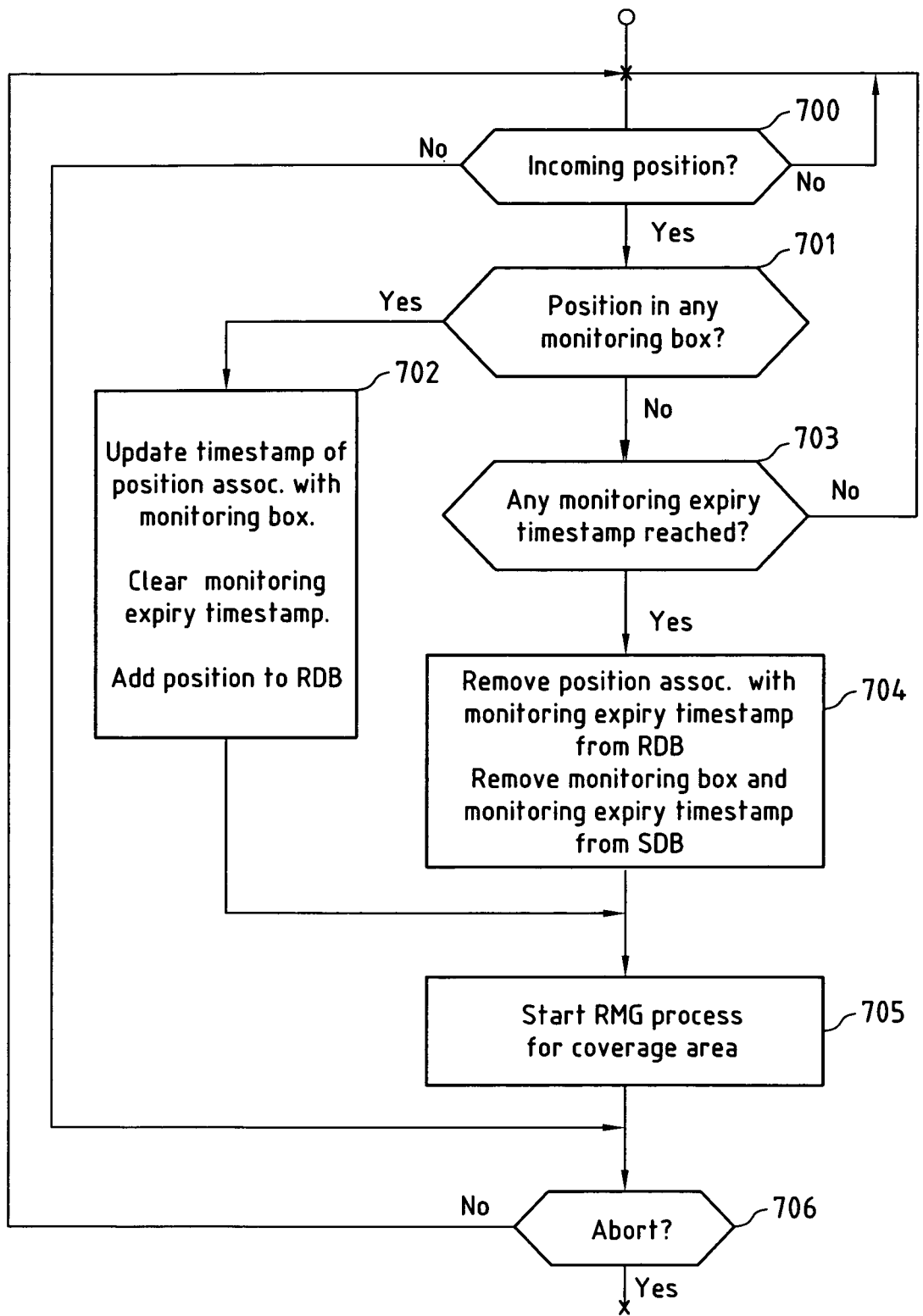
FIG. 7*a*: a flowchart of an exemplary embodiment of a method for monitoring and checking if monitoring expiry timestamps have expired according to the present invention.
Figure 7B:
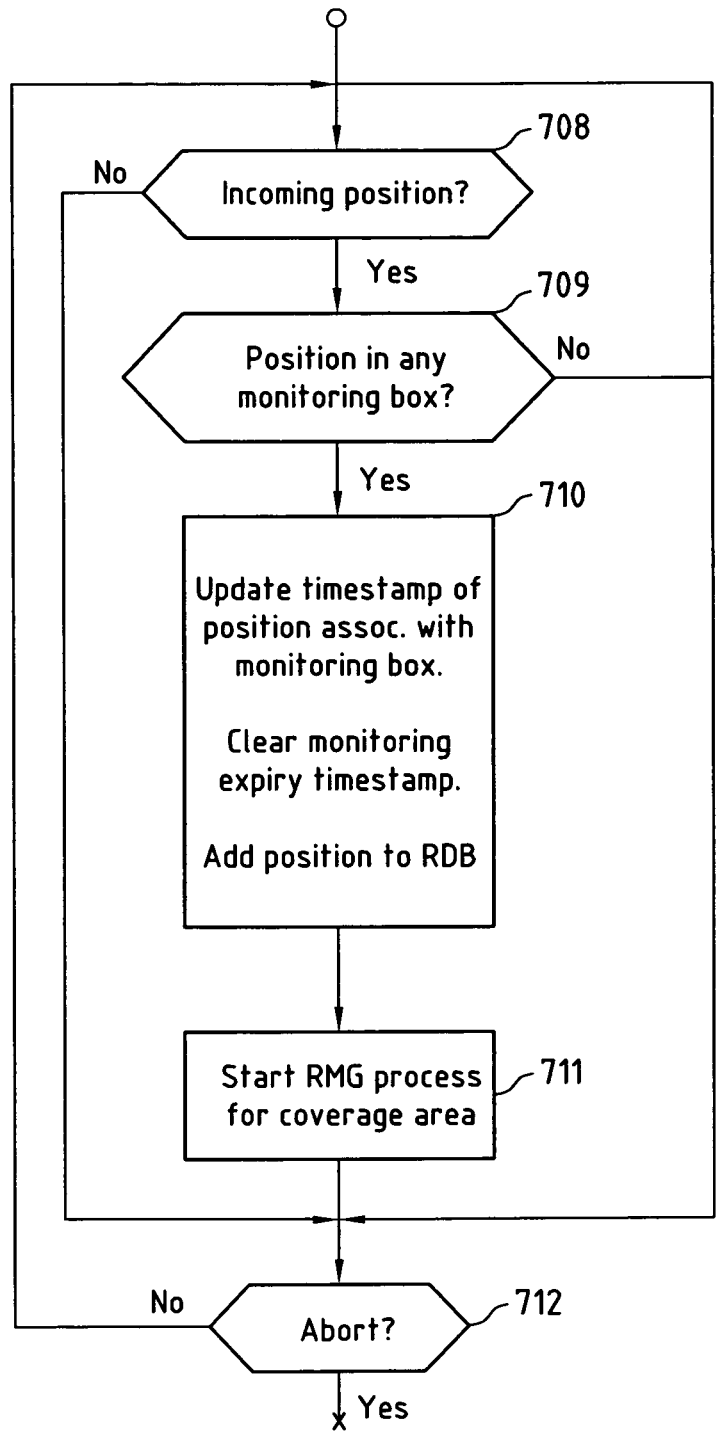
FIG. 7*b*: a flowchart of a further exemplary embodiment of a method for monitoring according to the present invention.

FIGS. 6a and 6b (and also FIGS. 7a and 7b presented below) are flowcharts of exemplary embodiments of a method according to the present invention. These flowcharts may for instance be implemented as computer programs that are stored in program memory 43 of apparatus 4 (see FIG. 4). Consequently, these flowcharts may be executed by processor 40 of apparatus 4. Equally well, these flowcharts may be implemented as program code 52 of computer program 51 stored on tangible storage medium 50 (see FIG. 5).

In the flowchart of FIG. 6a, monitoring is exemplarily performed for a single position out of a set of one or more positions associated with a coverage area, based on a defined environment of the position for which the monitoring is performed. It is however to be noted that this monitoring may equally well be performed for more than one position at a time, for instance in separate threads. Furthermore, it is assumed that the monitoring of the position and the checking if the position has been validated before the defined time instant is performed by the same apparatus (e.g. apparatus 4 of FIG. 4).

In a first step 600, it is checked if a position associated with the coverage area and lying in the defined environment of the position for which the monitoring is performed is received. If this is the case, in a step 601, a time instant (e.g. a time stamp) associated with the position for which the monitoring is performed is updated (for instance to indicate to a process that determines if positions in the set of one or more positions are potentially outdated that the position for which the monitoring is performed is not potentially outdated), and the flowchart terminates. Step 601 may optionally further comprise clearing (e.g. setting to a characteristic value such as 0) the defined environment and/or the defined time instant (and of further information related to the monitoring of the position, if necessary), to indicate that monitoring is no longer performed for the position. Step 601 may optionally further comprise addition or triggering of addition of the received position to the set of one or more positions, and updating or triggering updating of at least one model for the coverage area of the base station based on the set of one or more positions (with the added position).

If the checking in step 600 is negative, it is checked if the defined time instant has passed in a step 602. If this is not the case, the flowchart returns to step 600 and repeats checking positions. Otherwise, the position for which monitoring is performed is removed from the set of one or more positions, or its removal (and associated information such as the monitor box) is caused in a step 603. In a step 604, then updating of at least one model for the coverage area of the base station based on the set of one or more positions (without the removed position) is performed or triggered, and the method terminates.

In the flowchart of FIG. 6b, monitoring is once again exemplarily performed for a single position out of a set of one or more positions associated with a coverage area, based on a defined environment of the position for which the monitoring is performed. In contrast to the flowchart of FIG. 6a, the checking if the defined time instant is reached is however not part of the flowchart, since this checking is performed by another process, which may be implemented by the same unit (e.g. apparatus 4 of FIG. 4) that implements the flowchart of FIG. 6b, or equally well by another unit.

In a first step 606, it is checked if a position associated with the coverage area and lying in the defined environment of the position for which the monitoring is performed is received. If this is the case, in a step 607, the time instant (e.g. the timestamp) associated with the position for which monitoring is performed is updated (for instance to indicate to a process that determines if positions in the set of one or more positions are potentially outdated that the position for which the monitoring is performed is not potentially outdated), or its updating by another unit is triggered, and the flowchart terminates. Furthermore, in step 607, information associated with the position for which monitoring is performed is modified, as will be explained in further detail below.

If no matching position is received in step 606, the flowchart repeats performing step 606. This loop may for instance be terminated by an explicit event or by modifying one or more parameters that indicate that monitoring shall be performed for a specific position, or by modifying the information on which the monitoring is based, for instance by removing the information on the defined environment and/or the defined time instant.

As already stated, in the flowchart of FIG. 6b, it is only checked if a position lies in the defined environment of the position for which the monitoring is performed, but not if this position is received within any time boundaries. This latter checking may for instance be performed by another process. This process is configured to remove or trigger removal of the position for which the monitoring is performed from said set of one or more positions in case that no report comprising a position associated with the coverage area, lying in the defined environment of the position for which the monitoring is performed and being associated with a time instant that is before the defined time instant associated with the position for which the monitoring is performed. This process may for instance step through the positions in the set of one or more positions, determine, if monitoring is performed for a position, and, if this is the case, determine if the position has been validated in the monitoring before the defined time instant associated with this position. An example of such a process is described with reference to the flowchart of FIG. 8b below.

It may be indicated to the process in a plurality of ways whether monitoring is presently performed for a position in the set of one or more positions or not, for instance via information respectively associated with the position. For instance, there may be a dedicated indicator, such as a flag (e.g. a bit), that indicates if monitoring is currently performed or not. Equally well, the presence of parameters related to monitoring, such as parameters defining the defined environment and/or the defined time instant, may be indicative of whether monitoring is performed or not. Equally well, the parameters specifying the defined environment and/or the defined time instant may be set to characteristic values (e.g. to 0) to indicate that no monitoring is performed. The choice of a suited indication is within the skills of a person skilled in the art. For instance, if the defined environment is based on a pre-defined environment that is centered around the position for which the monitoring is performed, it may not be necessary to explicitly store this defined environment for each position (since it can be determined by a unit that performed the monitoring, albeit this may increase the computational complexity of monitoring). Similarly, if the defined time instant is for instance based on a regular schedule that is not specific for the positions for which monitoring is performed, it may not be necessary to explicitly store the defined time instant for each position. If both the defined environment and the defined time instant are not stored, it may for instance be advisable to use an explicit flag to indicate if monitoring is performed for a position or not.

Consequently, the communication between the flowchart of FIG. 6b and the process may be based on modification of such information, see step 607. As a simple example, monitoring can be indicated to be performed for a position if there is a defined time instant for the position that is not set of a characteristic value, such as 0, wherein this defined time instant is for instance stored in a database that is accessible by both the apparatus that implements the flowchart of FIG. 6b and the apparatus that implements the process. When a position for which monitoring is performed is validated in the flowchart of FIG. 6b, then the definition of the defined time instant is set to the characteristic value in step 607 of the flowchart of FIG. 6b. The process, when checking the position that was validated, will not remove this position, since the pre-condition for removal, i.e. that the position has to be in monitoring, is not fulfilled.

Returning to the context of the exemplary system of FIG. 1, apparatus 4 of FIG. 4 may for instance be considered to represent FPFR block 11 or a part thereof. The set of positions for which monitoring is performed may for instance comprise the positions in the reports stored in RDB 13 (which may for instance form a polygon). One or more of these positions may then be monitored, for instance since they are suspected to be outdated or outliers, as will be described in further detail below.

If a position of a report is considered to be a potential outlier or potentially outdated, the report may be assigned a monitoring box (representing the defined environment) and a monitoring expiry timestamp (representing the defined time instant). Therein, the monitoring expiry timestamp may for instance be obtained by adding a time interval (which may be fixed, e.g. pre-defined, or variable) to a specific time instant, for instance a time instant at which it is decided that monitoring should be performed, or a time instant that indicates when a report that contained the position for which monitoring is performed was generated, reported or received, or a time instant at which the position was last validated (e.g. received a hit in monitoring). Therein, the monitoring box and the monitoring expiry timestamp associated with the report may then be stored in SDB 12 (see Table 3) to indicate that the report shall be monitored and when this monitoring shall terminate.

Structure and operation of apparatus 4 will now be explained in the context of the exemplary system of FIG. 1 with reference to the flowcharts of FIGS. 7a and 7b, which may be understood as even more detailed representations of the flowcharts of FIGS. 6a and 6b, respectively.

When processor 40 of apparatus 4 (see FIG. 4) shall implement the exemplary flowchart of FIG. 7a, i.e. performs both monitoring of incoming positions and checking of the expiration of the monitoring expiry timestamps, processor 40 may thus for instance have access, with respect to each position for which monitoring shall be performed, to the monitoring box and the monitoring expiry timestamp stored in SDB 12 via input interface 41. Equally well, if mass storage 45 is present and implements SDB 12, processor 40 may have access to the monitoring box and the monitoring expiry timestamp directly via the connection between processor 40 and mass storage 45.

Processor 40 may then for instance also receive positions reported by terminals and associated with the coverage area of the base station via input interface 41 and check if any of these positions are within the monitoring box and are received before a time instant specified by the monitoring expiry timestamp. Therein, only the positions received by processor 40 before the monitoring expiry timestamp is reached may be considered to validate the position for which the monitoring is performed. Equally well, if the positions are associated with a timestamp, which may for instance indicate a time instant when the respective position is measured/reported (e.g. by a terminal) or received by a unit different from processor 40 (e.g. a further unit in FPFR block 11), the positions with a timestamp before the monitoring expiry timestamp (which may however be received after the monitoring expiry timestamp is reached) may still be considered to validate the position for which the monitoring is performed.

Output interface 42 may then for instance be used to signal to RDB 13 (see FIG. 1) that the position for which monitoring is performed shall be removed, if this position is not validated in the monitoring, and/or to update or to trigger updating of timestamps of a validated position in RDB 13.

It is exemplarily assumed here that RDB 13 and SDB 12 only store information pertaining to one specific coverage area (and base station). It is readily clear that RDB 13 and SDB 12 may equally well store information pertaining to several coverage areas without affecting the functioning of the flowchart of FIG. 7a in any way.

Turning now to FIG. 7a, in a first step 700, it is checked if any positions associated with the coverage area are received (for instance positions reported by terminals as fingerprints that are separated into base-station/coverage-area-specific reports). If this is not the case, the flowchart proceeds to step 706 to check if the process shall be aborted, and if this is the case, terminates. If the process shall not be aborted, the checking in step 700 is repeated.

If step 700 determines that a position has been received, it is checked in step 701 if this position hits any monitoring box stored in SDB 12. If this is the case, the corresponding position is considered to be validated, and, in step 702, the timestamp of the position (or the report it is contained in) is updated (see Table 3). Therein, when exemplarily assuming that the timestamp in SDB 12 originally (i.e. before the first updating) reflected the time instance at which the fingerprint/report was received (e.g. by FPFR block 11), updating of the timestamp thus allows the timestamp in SDB 12 to be considered to represent the last time a position in the vicinity (as defined by the monitoring box) of the position (contained in the report) was received.

Furthermore, in step 702, the monitoring box and the monitoring expiry timestamp are cleared (for instance set to a characteristic value, such as 0) in SDB 12 to indicate that the corresponding position is no longer in monitoring. As already discussed above, it is readily clear for a person skilled in the art that there exist a variety of alternative possibilities to indicate in SDB 12 if monitoring shall be performed for a position.

Furthermore, in step 702, the incoming position that hit the monitoring box is added to RDB 13 (for instance by adding the report that contains the position to RDB 13). This may be advantageous if the position for which monitoring is performed is a potential outlier, since it may then be the case that the coverage area has moved and it may then be good to have the position that hit the monitor box (in addition to the position for which monitoring is performed) as a basis for an updating of the coverage model and the pre-models. This may furthermore be advantageous if the coverage area has increased by a small amount.

The flowchart then proceeds to step 705. Since the reports in RDB 13 serve as a basis for the generation/updating of the coverage model and the pre-models (see FIG. 3), the RMG process is started for the coverage area (represented by the positions of the reports stored in RDB 13) to trigger updating of the coverage model and the pre-models (see RMG block 14 of FIG. 1 and FIG. 3). After step 705, the flowchart proceeds to step 706 to allow abortion or continuation of the process as already explained above.

If it is decided in step 701 that the position is not in any monitoring box, it is checked in step 703 if any monitoring expiry timestamp has been reached. If this is not the case, the flowchart returns to step 700 and checks for further incoming positions.

Otherwise, since monitoring expiry timestamps of validated reports are removed in step 702, a positive outcome of the checking in step 703 indicates that the position associated with the reached monitoring expiry timestamp has not been validated, and the flowchart proceeds to step 704 and removes the position/report from RDB 13. This step also comprises removing of the associated monitoring box and monitoring expiry timestamp from SDB 12.

The flowchart then proceeds to step 705, where once again the RMG process is started for the coverage area (represented by the positions/reports stored in RDB 13) to trigger updating of the coverage model and the pre-models by the RMG process (see RMG block 14 of FIG. 1 and FIG. 3). In the exemplary system of FIG. 1, the finding that positions/reports have to be removed from RDB 13 may furthermore trigger state transitions in the state machine, for instance if the last position/report in RDB 13 has been removed (indicating that there are not up-to-date positions/reports from a coverage area).

The flowchart then again proceeds to step 706 to allow abortion or continuation of the process.

As an alternative embodiment, processor 40 of apparatus 4 (see FIG. 4) may implement the exemplary flowchart of FIG. 7b, i.e. performs monitoring of incoming positions possibly without checking of the expiration of the monitoring expiry timestamps, since this is performed by a process that may be implemented by another unit. Therein, it is again exemplarily assumed that it is indicated via the value of the monitoring expiry timestamp if monitoring shall be performed for a position or not. Setting the monitoring expiry timestamp to a characteristic value, such as 0, indicates that no monitoring shall be performed.

Processor 40 then may have access, with respect to each position for which monitoring shall be performed, at least to the monitoring box (to be able to check if a position within the monitoring box was received) and the monitoring expiry timestamp (to be able to decide that monitoring shall actually be performed for a position) stored in SDB 12 via input interface 41. Equally well, if mass storage 45 is present and implements SDB 12, processor 40 may have access to at least the monitoring box and the monitoring expiry timestamp directly via the connection between processor 40 and mass storage 45. Processor 40 may then for instance also receive positions reported by terminals and associated with the coverage area of the base station via input interface 41 and check if any of these positions are within the monitoring box.

Output interface 42 may then for instance be used to modify and/or delete at least the monitoring expiry timestamps in SDB 12, to indicate to a process that removes positions for which validation was not successful that validation was successful. It may also be used to update or trigger updating of timestamps of validated positions in RDB 13.

Once again, it is exemplarily assumed here that RDB 13 and SDB 12 only store information pertaining to one specific coverage area (and base station).

Turning now to FIG. 7b, in a first step 708, it is checked if any positions associated with the coverage area are received, as already explained with reference to step 700 of FIG. 7a above. If this is not the case, the flowchart proceeds to step 712 to check if the process shall be aborted, and if this is the case, terminates. If the process shall not be aborted, the checking in step 708 is repeated.

If step 708 determines that a position has been received, it is checked in step 709 if this position hits any monitoring box associated with a position for which monitoring shall be performed stored in SDB 12. If this is not the case, the flowchart proceeds to step 712 to check if the process shall be aborted. If, in step 709, the position is found to hit a monitoring box, the corresponding position is considered to be validated, and, in step 710, the timestamp of the position (or the report it is contained in) is updated (see Table 3), or updating is triggered. Furthermore, the monitoring expiry timestamp in SDB 12 is cleared (i.e. set to the characteristic value, e.g. 0) to indicate to a process that is configured to remove positions from RDB 13 that are not validated within their respective monitoring expiry time that the corresponding position is no longer in monitoring (as already discussed before, this is however only one exemplary possibility to indicate that no monitoring is performed for a position). In step 710, also the incoming position that hit the monitoring box is added to RDB 13 (for instance by adding the report that contains the position to RDB 13).

The flowchart then proceeds to step 711, where the RMG process is started for the coverage area (represented by the positions of the reports stored in RDB 13) to trigger updating of the coverage model and the pre-models (see RMG block 14 of FIG. 1 and FIG. 3). After step 711, the flowchart proceeds to step 712 to allow abortion or continuation of the process as already explained above.

It should be noted that processor 40 of apparatus 4 (see FIG. 4) may also implement further functionality of the functional blocks shown in the exemplary system of FIG. 1. For instance, processor 40 may be configured to split incoming fingerprints into base-station-specific reports, to perform screening (pre-filtering) of the reports, for instance based on the pre-models, for instance in dependence on the current state of a state machine, in order to reduce the amount of reports that has to be considered by the RMG process when generating/updating the coverage model and the pre-models, to implement the RMG process of generating/updating the coverage model and the pre-models, to perform detection of potential outliers, to perform detection of potentially outdated reports and to operate a state machine that affects operation of the exemplary system of FIG. 1, to name but a few examples. Consequently, mass storage 45 of apparatus 4, if present, may then implement one or more of SDB 12, RDB 13 and RMDB 15, either as separate databases or as a single common data base. Furthermore database or databases may be realized as several physical instances that may implement the database partially, for instance based on geographical division.

If processor 40 of apparatus 4 (see FIG. 4) also implements the screening of incoming reports, it may for instance be advantageous that all positions/reports that are considered to be within a monitoring box (see steps 701 and 702 of FIG. 7a and steps 709 and 710 of FIG. 7b) are stored to RDB 13 without any further (potentially state-dependent) screening. Such screening may then for instance only be performed for those positions/reports that are determined in step 701 of FIG. 7a or step 709 of FIG. 7b not to be within any monitor box.

As already stated above, the monitoring of a position as shown in the exemplary flowcharts of FIGS. 6a/6b and 7a/7b may exemplarily be triggered by a decision that this position is potentially outdated or is a potential outlier. These decisions may for instance be made by the same unit that performs the monitoring (e.g. processor 40 of apparatus 4, see FIG. 4), or at least partially by another unit. The one or more units that make these decisions may then also provide the defined environment (e.g. the monitoring boxes) and the defined time instant (e.g. the monitoring expiry timestamp) to be used in this monitoring. Therein, the defined environment may for instance be based on a pre-defined area that then simply has to be set up around the position for which monitoring is performed. Alternatively, at least one dimension of the defined environment may at least in some cases be adapted to the position for which monitoring shall be performed or to other parameters, such as for instance the amount and/or rate of incoming reports. For instance, the environment may be smaller in case of a high rate of incoming reports as compared to a low rate of incoming reports. Similarly, the defined time instant may for instance be based on a pre-defined time interval that then simply has to be added to a time instant, for instance a time instant at which it is determined that monitoring for a position shall be performed, or to a timestamp of the report that contains the position for which the monitoring shall be performed to obtain the defined time instant. The time interval may of course also be variable, it may for instance be controlled depending on the amount and/or frequency of incoming reports. When controlling the at least one dimension or the time interval according to the amount and/or frequency of incoming reports, a current time may be taken into account. The control may for instance be calendar-based and may yield different results for different times of the year, so account for the fact that the amount and/or frequency of incoming reports may change over a year (as for instance in case of a skiing ressort).

It may also be the case that the determining of the defined time instant is different depending on whether monitoring is triggered by a decision that the position for which monitoring shall be performed is a potential outlier or is potentially outdated, and the same may hold for the determining of the defined environment. For instance, a shorter time duration may be added to a current time instant to obtain the monitoring expiry timestamp in case of potential outliers as compared to the case of a potentially outdated position.

In the following, exemplary embodiments of a process for detecting potentially outdated positions and of a process for detecting potential outliers will be presented in the context of the exemplary system of FIG. 1.

Figure 8A:
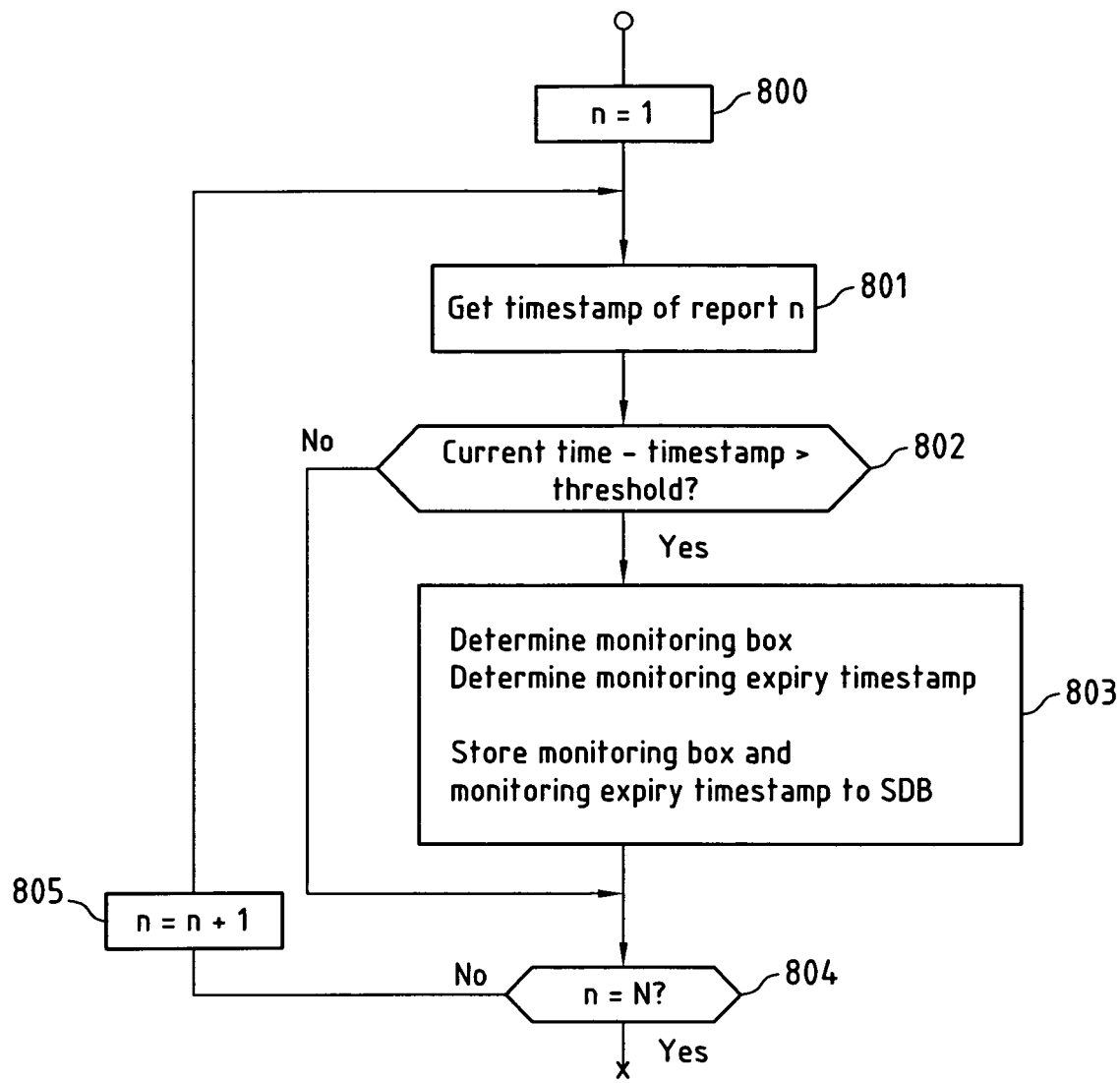
FIG. 8*a*: a flowchart of an exemplary process for determining potentially outdated positions according to the present invention.

FIG. 8a is a flowchart of an exemplary method for determining if a set of N positions, which is exemplarily assumed to be represented by the positions of the N reports stored in RDB 13 of FIG. 1 and is associated with a coverage area of a base station (the extension to several coverage area is again straightforward), contains one or more potentially outdated positions. This method may for instance be performed by processor 40 of apparatus 4 (see FIG. 4). In the exemplary system of FIG. 1, this method may for instance be implemented by FPFR block 11 or RMG block 14. Therein, execution of the flowchart of FIG. 8a may for instance be triggered repeatedly, for instance in defined intervals, which may be fixed (pre-defined) or equally well variable, for instance dynamically adjusted, for instance in dependence on an amount and/or a frequency of incoming reports for a coverage area. Furthermore, in the flowchart of FIG. 8a, it is exemplarily assumed that all reports/positions in RDB 13 are checked subsequently in a block-processing. Alternatively, the checking for potentially outdated positions may not follow a specific order, it may equally well be performed individually for single positions, for instance in response to specific events, and/or according to a time schedule that may for instance be influenced by the time instant a report/position is received, as for instance expressed by a timestamp. For instance, after reception (or adding to RDB 13), a report/position may be checked to be potentially outdated periodically with a fixed period, with the first period starting with the reception (or adding to RDB 13) of the report/position.

In the flowchart of FIG. 8a, in a first step 800, a running variable n is initialized to 1, In step 801, the timestamp associated with the n-th report in RDB 13 is obtained (see Table 1). As already explained above, this timestamp may for instance represent the time the n-th report was originally received, or (when monitoring and updating according to step 702 of FIG. 7 has already taken place) the last time a report with a position in the vicinity (as defined by a monitoring box) of the position of the report associated with the timestamp was received. In step 802, it is then determined if the current time minus this timestamp is larger than a threshold. This threshold indicates the maximum age a report can reach without being considered potentially outdated. The threshold may for instance be a pre-defined threshold. Alternatively, the threshold may be controllable, for instance to be able to control a frequency of monitoring and thus the amount of computation power that has to be spent on monitoring.

If it is determined in step 802 that the difference between the current time and the timestamp of the report is larger than the threshold, the report (and the position contained therein) is considered to be potentially outdated and is put into monitoring in a step 803. This is accomplished by determining a monitoring box and a monitoring expiry timestamp for the report, and storing these values to SDB 12 (see FIG. 1 and Table 3). Therein, it is exemplarily assumed that the monitoring box is determined by specifying the coordinates of a square box that is centred around the position, and that the monitoring expiry timestamp is determined by adding a pre-defined time period to the current time. As indicated above, further alternatives to this determining of the monitoring box and the monitoring expiry timestamp exist. As already discussed above, optionally further steps may have to be taken (for instance a flag to be set in SDB 12) to indicate to the process that performs the monitoring based on the monitoring box and the monitoring expiry timestamp that monitoring for the position of the report shall be performed.

After this step, and also if the checking in step 802 is negative, step 804 is entered, in which it is checked if the running index n equals the number of reports N in RDB 13, and if this is the case, the flowchart terminates. Otherwise, running index n is incremented by 1 in step 805, and the flowchart jumps back to step 801 to check the next report.

The steps of the flowchart of FIG. 8 may for instance be performed continuously, periodically or be triggered by specific events, to name but a few examples. It is readily clear that the flowchart of FIG. 8 can also be changed rather simply to be executed in an endless loop once started removing step 804, letting step 805 directly follow step 803 and changing step 801 in a way that the timestamp of report n modulo N is obtained.

Figure 8B:
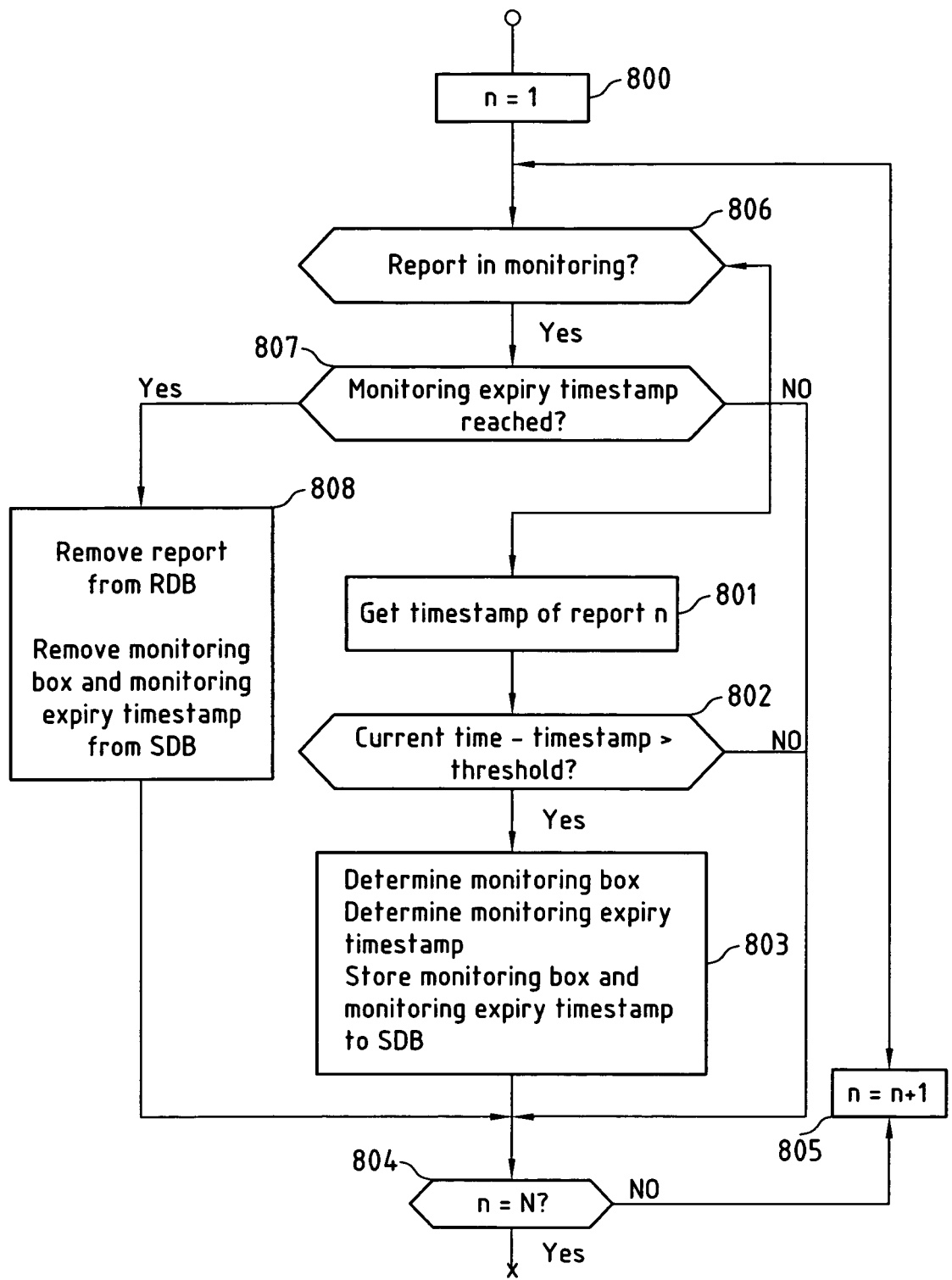
FIG. 8b: a flowchart of an exemplary process for determining potentially outdated positions and for removing positions with expired monitoring expiry timestamps according to the present invention.

FIG. 8b is a flowchart of an alternative exemplary method for determining if a set of N positions, which is exemplarily assumed to be represented by the positions of the N reports stored in RDB 13 of FIG. 1 and is associated with a coverage area of a base station, contains one or more potentially outdated positions. Therein, it is exemplarily assumed that the checking for potentially outdated reports also comprises a process of removing positions that were not validated in monitoring and have expired monitoring expiry timestamps, as already explained with reference to FIGS. 6b and 7b above.

The flowchart of FIG. 8b may for instance be performed by processor 40 of apparatus 4 (see FIG. 4). In the exemplary system of FIG. 1, this method may for instance be implemented by FPFR block 11 or RMG block 14.

The steps of the flowchart of FIG. 8b that correspond to the steps of the flowchart of FIG. 8a have been assigned the same reference numerals.

In the flowchart of FIG. 8b, it is thus checked for each report n if its position is in monitoring, see step 806. Therein, as explained above, it is exemplarily assumed that a characteristic value for the monitoring expiry timestamp of a position stored in SDB 12 is used to indicate that no monitoring is performed for the position (and any other choice of the monitoring expiry timestamp then indicates that monitoring is performed). If the report is determined to be not in monitoring, the checking for potentially outdated reports of steps 801-803 is performed as already explained with reference to FIG. 8a above.

If the position is found to be in monitoring, it is checked in step 807 if the monitoring expiry timestamp has already been reached, which indicates that the monitoring did not lead to validation of the position (otherwise, the monitoring box and the monitoring expiry timestamp would have been removed/cleared, see step 710 of the flowchart of FIG. 7b). If this is the case, in a step 808, the report comprising the position is removed from RDB 13, and also the monitoring box and the monitoring expiry timestamp is removed from SDB 12. Moreover, the coverage area is put into the RMG queue for the update of the coverage area models. The flowchart then proceeds to the next report or terminates. If it is determined in step 807 that the monitoring expiry timestamp has not been reached yet, the flowchart also proceeds to checking of the next report or terminates.

It is readily clear for a person skilled in the art that the process of removing reports/positions with expired monitoring expiry timestamps may equally be implemented independent from the checking for potentially outdated reports.

Figure 9:
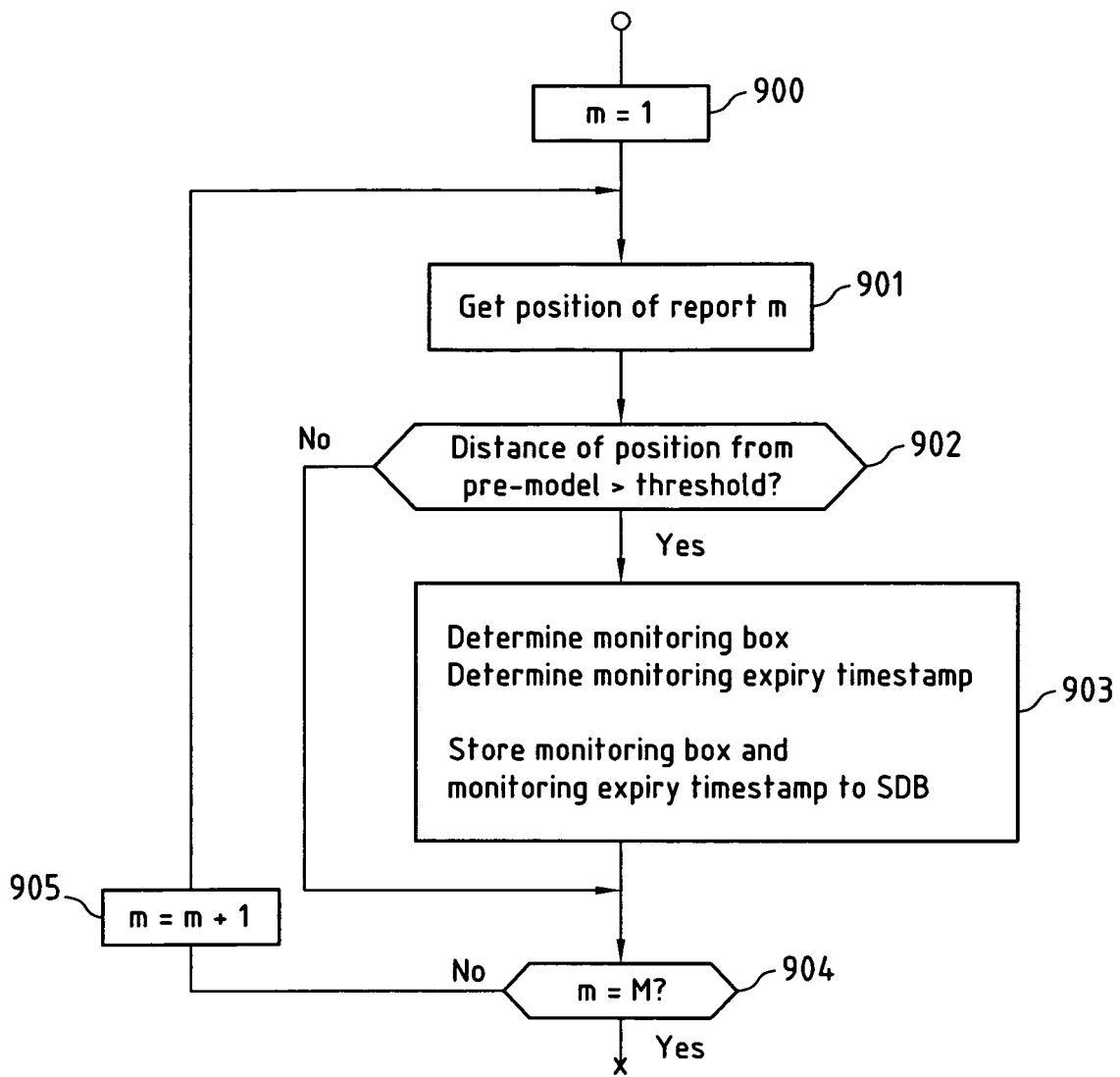
FIG. 9: a flowchart of an exemplary process for determining potential outliers according to the present invention.

FIG. 9 is a flowchart of an exemplary method for determining if a set of M positions associated with the coverage area of a base station (the extension to several coverage areas is again straightforward), contains one or more potential outliers. This method may for instance be performed by processor 40 of apparatus 4 (see FIG. 4). In the exemplary system of FIG. 1, this method may for instance be implemented by RMG block 14, see for instance block 302 of FIG. 3. For instance, when a new report associated with a specific coverage area arrives, passes screening in FPFR block 11 and is added to RDB 13, the RMG process may be started to generate/update the coverage model and the pre-models, and in the context of this generation/updating, it may be checked for all positions (comprised in reports) stored in RDB 13 for this specific coverage area if they are potential outliers or not. In the flowchart of FIG. 9, M may then denote the number of all positions stored in reports in RDB 13 for a specific coverage area. Alternatively, when the RMG process is started, only newly incoming positions, i.e. positions that were not available in the last run of the RMG process or were not already considered in the last run of the RMG process, may be checked to be potential outliers, and then the variable M in the flowchart of FIG. 9 may then denote only the positions/report that are new.

In the flowchart of FIG. 9, in a first step 900, a running variable m is initialized to 1. In step 901, the position contained in the m-th report in RDB 13 (see Table 1) is obtained. In step 902, it is then determined if the distance of the position from a pre-model, for instance from a border or centre thereof, is larger than a threshold. This threshold indicates the maximum distance a position can have from a pre-model without being considered a potential outlier. The threshold may for instance be a pre-defined threshold. It may be an absolute threshold or a relative threshold that for instance takes the size of the assumed coverage area into account. Therein, the pre-model may for instance be the matrix-form ellipse, since this ellipse for instance allow computing a distance from it according to the "elliptical distance" $(x-c)^T A (x-c)$ (with x, c and A as already defined above, and a distance of 1 indicating that the position is on the boundary of the ellipse), which may require less computations than determining a distance from an ellipse in axis/angle-form. Similarly, other pre-models may be used, for instance also a circular model that assumes a specific maximum possible radius for a specific type of coverage area.

If it is determined in step 902 that the distance of the position from the pre-model is larger than the threshold, the position is considered to be a potential outlier and is put into monitoring in a step 903. This is accomplished by determining a monitoring box and a monitoring expiry timestamp for the report, and storing these values to SDB 12 (see FIG. 1 and Table 3). Therein, it is again exemplarily assumed that the monitoring box is determined by specifying the coordinates of a square box that is centred around the position, and that the monitoring expiry timestamp is determined by adding a pre-defined time period to the current time. As indicated above, further alternatives to this determining of the monitoring box and the monitoring expiry timestamp exist. As also already discussed above, optionally further steps may have to be taken (for instance a flag to be set in SDB 12) to indicate to the process that performs the monitoring based on the monitoring box and the monitoring expiry timestamp that monitoring for the position of the report shall be performed.

After this step, and also if the checking in step 902 is negative, step 904 is entered, in which it is checked if the running index m equals the number of reports M, and if this is the case, the flowchart terminates. Otherwise, running index m is incremented by 1 in step 905, and the flowchart jumps back to step 901 to check the next report.

Figure 10A:
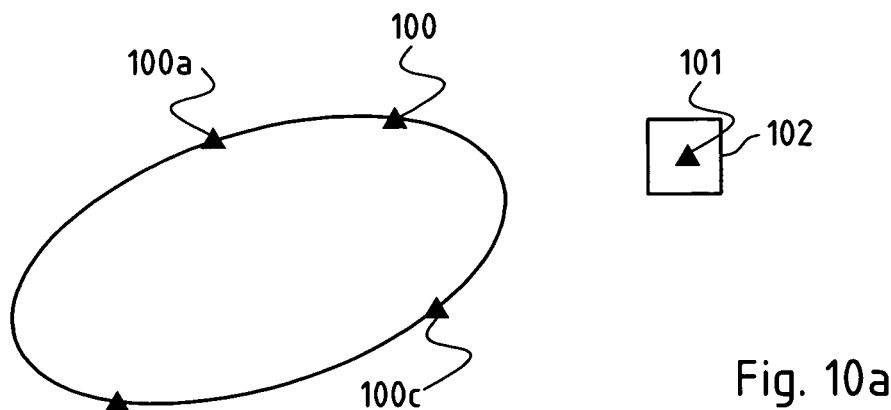
FIG. 10a: a schematic illustration of an example of monitoring of a potential outlier according to the present invention.
Figure 10B:
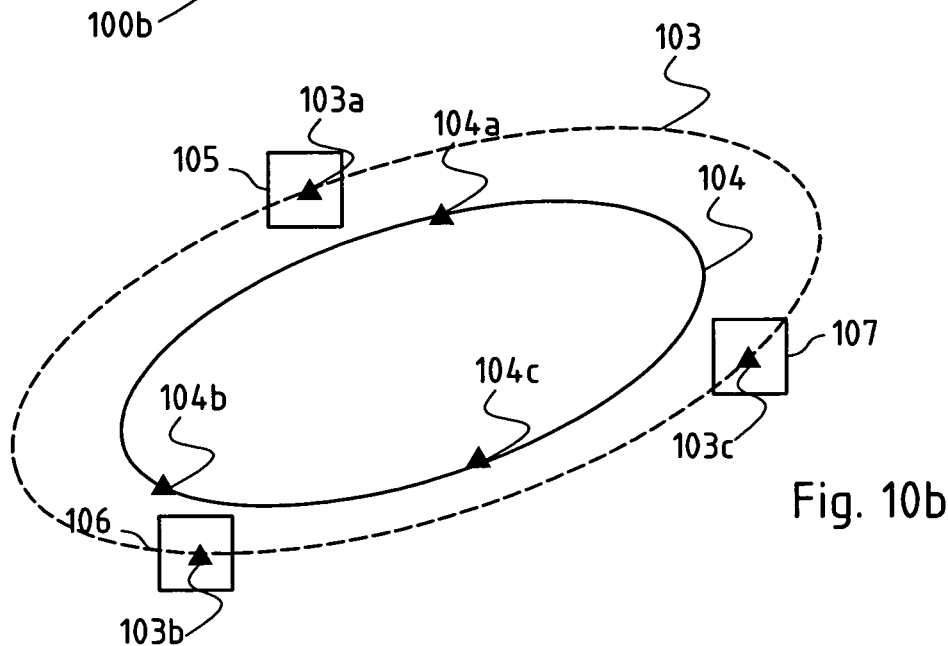
FIG. 10b: a schematic illustration of an example of monitoring of potentially outdated positions according to the present invention.
Figure 10C:
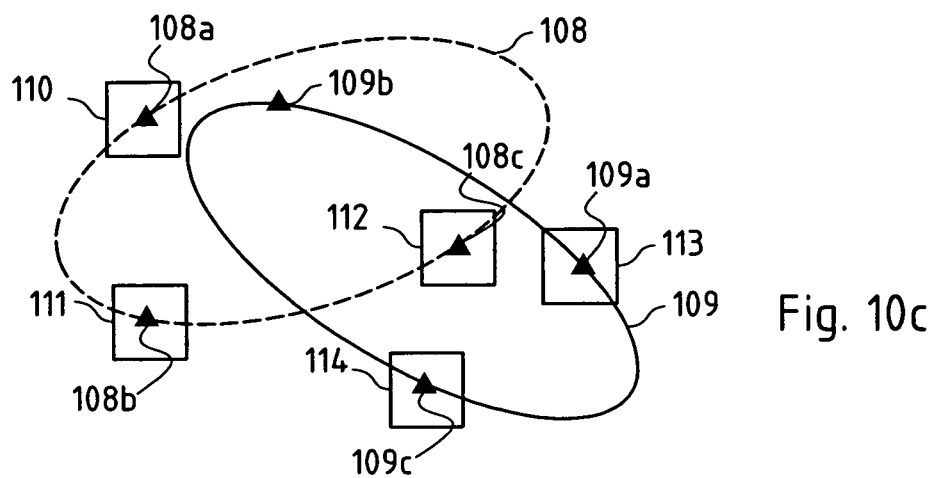
FIG. 10c: a schematic illustration of an example of monitoring of potential outliers and potentially outdated positions according to the present invention.

FIGS. 10a-10c illustrate exemplary use cases of concepts of the present invention in the context of the exemplary system of FIG. 1. Therein, as already explained above, it is assumed that an elliptical coverage model is generated as the minimum ellipse around a convex polygon that encloses all positions reported by one or more terminal associated with a coverage area. The vertices of the convex polygon and also newly reported terminal positions are stored in RDB 13 (see FIG. 1) and serve as a basis for the RMG process.

In FIG. 10a, it is assumed that such a coverage model 100 has already been generated based on a convex polygon with vertices 100a, 100b and 100c. If position 101 is reported, this position 101 may for instance be classified as a potential outlier, since it may for instance exceed a threshold distance to a pre-model of the coverage area (which pre-model may for instance also have the form of ellipse 100). A monitoring box 102 is then set up around potential outlier 101, and if this monitoring box 102 does not receive a hit (a reported further position) before its monitoring expiry time expirers, the position 101 is removed from RDB 13, since it in fact turned out to be an outlier.

In FIG. 10b, an elliptical coverage model 103 has been generated for a coverage area based on a convex hull with vertices 103a, 103b and 103c. After a while, the coverage area however shrinks, for instance due to a power reduction of its base station. After vertices 103a, 103b and 103c have reached a certain age, they will be considered to be potentially outdated, and monitoring boxes 105, 106 and 107 will be set up for them. These monitoring boxes, due to the reduced coverage area, will not receive any more hits, so that vertices 103a, 103b and 103c will be removed from RDB 13. After a while, a new elliptical coverage model 104 will have consolidated as the minimum ellipse around a convex polygon with vertices 104a, 104b and 104c.

In FIG. 10c, an elliptical coverage model 108 has been generated for a coverage area based on a convex polygon with vertices 108a, 108b and 108c. After a while, the coverage area however moves, and the final shape will be described by the elliptical coverage model 109, based on a convex hull with vertices 109a, 109b and 109c. When the first terminal positions associated with the new coverage area are received, e.g. positions 109a and 109c, they may be classified as potential outliers, so that monitoring boxes 113 and 114 will be set up for them. However, since they are in fact no outliers, they will be quickly validated by further reports. Furthermore, after a while, the vertices 108a, 108b and 108c of the old coverage model 108 will be considered potentially outdated and put into monitoring with monitoring boxes 110, 111 and 112. Therein, monitoring boxes 110 and 111 won't receive any more hits, so that their associated positions 108a and 108b will be removed. Monitoring box 112 will receive hits, since it is in the intersection of the new and the old coverage area. However, the associated position 108c will not form a vertex of the convex hull on which the new coverage model 109 is based, since it is within this convex hull.

The following appendix describes exemplary algorithmic details of the present invention and is to be understood as part of the disclosure.

Appendix A.1: Coordinate and Ellipse Conversions

Straight lines on Earth are defined as those following the great circles (i.e. the circles on the surface of the earth dividing the Earth into two equal hemisphere so that the centre of the Earth lies on the plane defined by the great circles), and there is a difference between them and the straight lines in geodetic coordinates. These are luckily negligible for small coverage areas. At latitudes less than 80°, this error is less than 3 m for coverage areas with 5 km diameter, and less than 150 m for coverage area with 35 km diameter.

At latitude $\phi$, the length of one meter in East/North directions in degrees is:

$$s_E(\phi) = \frac{180}{\pi} \frac{\sqrt{1 - e^2\sin(\phi)^2}}{a\cos(\phi)} \text{ degrees/meter}$$

$$s_N(\phi) = \frac{180}{\pi} \frac{(1 - e^2\sin(\phi)^2)^{\frac{3}{2}}}{a(1 - e^2)} \text{ degrees/meter,}$$

where a and e are the WGS-84 semi-major axis and eccentricity of Earth.

Then a local conversion from 2D geodetic coordinates ($\phi$, $\lambda$) to Cartesian East-North coordinates (x, y) with origin at ($\phi_0$, $\lambda_0$) is $$\begin{bmatrix} x \\ y \end{bmatrix} = M \begin{bmatrix} \phi - \phi_0 \\ \lambda - \lambda_0 \end{bmatrix} \quad (1)$$

where $$M = \begin{bmatrix} 0 & s_E^{-1}(\phi_0) \\ s_N^{-1}(\phi_0) & 0 \end{bmatrix},$$

Conversion Between Axis/Angle-Form and Matrix-Form Ellipses

The centers of the axis/angle-form and the matrix-form ellipses are the same. Given an axis/angle-form ellipse with semi-axes with radii $r_1$ and $r_2$ (in meters), and clock-wise angle $\theta$ between first semiaxis and North, the corresponding matrix form is $$A = M^T \begin{bmatrix} \sin(\theta) & \cos(\theta) \\ \cos(\theta) & -\sin(\theta) \end{bmatrix} \begin{bmatrix} r_1^{-2} & 0 \\ 0 & r_2^{-2} \end{bmatrix} \begin{bmatrix} \sin(\theta) & \cos(\theta) \\ \cos(\theta) & -\sin(\theta) \end{bmatrix} M. \quad (2)$$

Conversely, given the matrix A, the corresponding semi-axis lengths and rotation angle of the axis/angle-form ellipse are $r_1 = \sqrt{\text{first eigenvalue of } MA^{-1}M^T}$ $r_2 = \sqrt{\text{second eigenvalue of } MA^{-1}M^T}$ $\theta = a \tan 2 (v_1, v_2)$ where v is the eigenvector of $MA^{-1}M^T$ corresponding to its first eigenvalue, and the a tan 2-function denotes the arc tangent taking the quadrants into account.

It is readily clear for a person skilled in the art that the logical blocks in the schematic block diagrams as well as the flowchart and algorithm steps presented in the above description and its appendices may at least partially be implemented in electronic hardware and/or computer software, wherein it may depend on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors (DSPs), application specific integrated circuits (ASICs), field programmable gate arrays (FPGAs) or other programmable devices. The computer software may be stored in a variety of computer-readable storage media of electric, magnetic, electro-magnetic or optic type and may be read and executed by a processor, such as for instance a microprocessor. To this end, the processor and the storage medium may be coupled to interchange information, or the storage medium may be included in the processor.

The invention has been described above by means of embodiments, which shall be understood to be exemplary and non-limiting. In particular, it should be noted that there are alternative ways and variations which are obvious to a skilled person in the art and can be implemented without deviating from the scope and spirit of the appended claims. It should also be understood that the sequence of all method steps presented above is not mandatory, also alternative sequences may be possible.

The invention claimed is:

1. An apparatus comprising:
 a processor, and
 a memory, said memory storing a program comprising program code,
 said memory and said program configured to, with said processor, cause said apparatus, when said program is executed on said processor, to perform, for a position of a set of one or more positions that have been derived from one or more reports received from one or more terminals and that are associated with a coverage area of a communication node, monitoring if a report comprising a position associated with said coverage area of said communication node and lying in a defined environment of said position for which said monitoring is performed is received from a terminal as a validation of said position for which said monitoring is performed,
 wherein said position comprised in said report received from said terminal is a validation of said position for which said monitoring is performed, if said position comprised in said report is associated with the same coverage area as said position for which said monitoring is performed and if said position comprised in said report is within a defined environment of said position for which said monitoring is performed, and wherein said memory and said program are further configured to, with said processor, cause said apparatus, when said program is executed on said processor, to perform at least one of modifying, in case that said report comprising said position associated with said coverage area and lying in said defined environment of said position for which said monitoring is performed is received, information associated with said position for which said monitoring is performed, terminating monitoring for said position in case that said report comprising said position associated with said coverage area and lying in said defined environment of said position for which said monitoring is performed is received, updating a time instant associated with said position for which said monitoring is performed in case that said report comprising said position associated with said coverage area and lying in said defined environment of said position for which said monitoring is performed is received and one of adding and triggering addition of said position comprised in said report to said set of one or more positions and one of updating and triggering updating of at least one model for said coverage area of said communication node based on said set of one or more positions including said added position in case that said report comprising said position associated with said coverage area and lying in said defined environment of said position for which said monitoring is performed is received.

2. The apparatus according to claim 1, wherein said set of one or more positions at least one of represents a model for said coverage area of said communication node and serves as a basis for at least one of generating and updating at least one model for said coverage area of said communication node.

3. The apparatus according to claim 1, wherein said monitoring for said position is triggered by at least one of a decision that said position for which said monitoring is performed is a potential outlier with respect to said coverage area of said communication node and a decision that said position for which said monitoring is performed is potentially outdated.

4. The apparatus according to claim 3, wherein said decision that said position for which said monitoring is performed is a potential outlier with respect to said coverage area of said communication node is based on at least one model for said coverage area of said communication node.

5. The apparatus according to claim 3, wherein said decision that said position for which said monitoring is performed is potentially outdated is based on a time instant associated with said position for which said monitoring is performed.

6. The apparatus according to claim 3, wherein said decision that said position for which said monitoring is performed is potentially outdated is made repeatedly.

7. The apparatus according to claim 1, wherein said defined environment has a rectangular or circular shape.

8. The apparatus according to claim 1, wherein said modified information prevents said position for which said monitoring is performed to be one of removed or triggered to be removed from said set of one or more positions by a process that is configured to one of remove and trigger removal of said position for which said monitoring is performed from said set of one or more positions in case that no report comprising a position associated with said coverage area, lying in a defined environment of said position for which said monitoring is performed and being associated with a time instant that is before a defined time instant associated with said position for which said monitoring is performed is received.

9. The apparatus according to claim 1, wherein said memory and said program are further configured to, with said processor, cause said apparatus, when said program is executed on said processor, to perform one of removing and triggering removal of said position for which said monitoring is performed from said set of one or more positions if no report comprising a position associated with said coverage area, lying in a defined environment of said position for which said monitoring is performed and being associated with a time instant that is before a defined time instant associated with said position for which said monitoring is performed is received.

10. The apparatus according to claim 9, wherein, in case of removal of said position for which said monitoring is performed from said set of one or more positions, at least one model for said coverage area of said communication node is update based on said set of one or more position excluding said removed position.

11. The apparatus according to claim 1, wherein said apparatus is at least one of a module, a terminal, an apparatus embodied in a chip and an apparatus that further comprises a user interface and a memory.

12. The apparatus according to claim 1, wherein said monitoring is performed to determine whether said position for which said monitoring is performed is at least one of an outlier and outdated.

13. The apparatus according to claim 1, wherein said position comprised in said report is associated with the same coverage area as said position for which said monitoring is performed if said position comprised in said report has been reported to be within said coverage area.

14. A method comprising:

for a position of a set of one or more positions that have been derived from one or more reports received from one or more terminals and that are associated with a coverage area of a communication node, monitoring if a report comprising a position associated with said coverage area of said communication node and lying in a defined environment of said position for which said monitoring is performed is received from a terminal as a validation of said position for which said monitoring is performed, wherein said position comprised in said report received from said terminal is a validation of said position for which said monitoring is performed, if said position comprised in said report is associated with the same coverage area as said position for which said monitoring is performed and if said position comprised in said report is within a defined environment of said position for which said monitoring is performed, and said method further comprising at least one of modifying, in case that said report comprising said position associated with said coverage area and lying in said defined environment of said position for which said monitoring is performed is received, information associated with said position for which said monitoring is performed, terminating monitoring for said position in case that said report comprising said position associated with said coverage area and lying in said defined environment of said position for which said monitoring is performed is received, updating a time instant associated with said position for which said monitoring is performed in case that said report comprising said position associated with said coverage area and lying in said defined environment of said position for which said monitoring is performed is received and one of adding and triggering addition of said position comprised in said report to said set of one or more positions and one of updating and triggering updating of at least one model for said coverage area of said communication node based on said set of one or more positions including said added position in case that said report comprising said position associated with said coverage area and lying in said defined environment of said position for which said monitoring is performed is received.

15. The method according to claim 14, wherein said set of one or more positions at least one of represents a model for said coverage area of said communication node and serves as a basis for at least one of generating and updating at least one model for said coverage area of said communication node.

16. The method according to claim 14, wherein said monitoring for said position is triggered by at least one of a decision that said position for which said monitoring is performed is a potential outlier with respect to said coverage area of said communication node and a decision that said position for which said monitoring is performed is potentially outdated.

17. The method according to claim 16, wherein said decision that said position for which said monitoring is performed is a potential outlier with respect to said coverage area of said communication node is based on at least one model for said coverage area of said communication node, and wherein said decision that said position for which said monitoring is performed is potentially outdated is based on a time instant associated with said position for which said monitoring is performed.

18. The method according to claim 16, wherein said decision that said position for which said monitoring is performed is potentially outdated is made repeatedly.

19. The method according to claim 14, further comprising one of removing and triggering removal of said position for which said monitoring is performed from said set of one or more positions if no report comprising a position associated with said coverage area, lying in a defined environment of said position for which said monitoring is performed and being associated with a time instant that is before a defined time instant associated with said position for which said monitoring is performed is received.

20. A non-transitory readable medium having a program comprising program code for performing the method according to claim 14, when said program is executed on a processor, stored thereon.

21. The method according to claim 14, wherein said monitoring is performed to determine whether said position for which said monitoring is performed is at least one of an outlier and outdated.

22. The method according to claim 14, wherein said position comprised in said report is associated with the same coverage area as said position for which said monitoring is performed if said position comprised in said report has been reported to be within said coverage area.

* * * * *